(12) United States Patent
Shirai

(10) Patent No.: US 10,093,371 B2
(45) Date of Patent: Oct. 9, 2018

(54) BICYCLE SEATPOST ASSEMBLY

(71) Applicant: SHIMANO INC., Sakai (JP)

(72) Inventor: Toyoto Shirai, Sakai (JP)

(73) Assignee: SHIMANO INC., Sakai (JP)

( * ) Notice: Subject to any disclaimer, the term of this patent is extended or adjusted under 35 U.S.C. 154(b) by 171 days.

(21) Appl. No.: 14/737,435

(22) Filed: Jun. 11, 2015

(65) Prior Publication Data

US 2016/0362153 A1 Dec. 15, 2016

(51) Int. Cl.
F16M 11/00 (2006.01)
B62J 1/08 (2006.01)

(52) U.S. Cl.
CPC ............ B62J 1/08 (2013.01); *B62J 2001/085* (2013.01)

(58) Field of Classification Search
CPC . B62J 1/08; B62J 2001/085; B62J 1/00; B62J 1/10; B62J 1/04
USPC .................................................. 248/161, 477
See application file for complete search history.

(56) References Cited

U.S. PATENT DOCUMENTS

| 6,079,774 | A | 6/2000 | Proust | |
|---|---|---|---|---|
| 6,719,257 | B1 * | 4/2004 | Greene | F16B 7/1418 248/161 |
| 7,367,740 | B2 * | 5/2008 | Lazic | F16C 11/10 248/125.1 |
| 2010/0052377 | A1 * | 3/2010 | Hsu | B62J 1/08 297/215.14 |
| 2012/0104809 | A1 * | 5/2012 | Hsu | B62J 1/08 297/215.13 |

FOREIGN PATENT DOCUMENTS

| TW | I405687 B | 3/2013 |
|---|---|---|
| WO | WO 96/05998 | 2/1996 |
| WO | WO 99/47408 | 9/1999 |

* cited by examiner

*Primary Examiner* — Christopher Garft
(74) *Attorney, Agent, or Firm* — Mori & Ward, LLP

(57) ABSTRACT

A bicycle seatpost assembly comprises a first cylinder, a second cylinder, a mounting structure, a first engagement portion, and a second engagement portion. The second cylinder is configured to be telescopically received in the first cylinder. The mounting structure is attached to a distal end part of the second cylinder. The mounting structure is configured to fixedly mount a bicycle saddle to the distal end part of the second cylinder. The first engagement portion is provided to an outer periphery of the second cylinder. The second engagement portion is configured to engage with the first engagement portion such that a circumferential position of the mounting structure relative to the second cylinder is selectively adjustable.

27 Claims, 24 Drawing Sheets

BICYCLE SEATPOST ASSEMBLY

BACKGROUND OF THE INVENTION

Field of the Invention

The present invention relates to a bicycle seatpost assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle seatpost assembly.

SUMMARY OF THE INVENTION

In accordance with a first aspect of the present invention, a bicycle seatpost assembly comprises a first cylinder, a second cylinder, a mounting structure, a first engagement portion, and a second engagement portion. The second cylinder is configured to be telescopically received in the first cylinder. The mounting structure is attached to a distal end part of the second cylinder. The mounting structure is configured to fixedly mount a bicycle saddle to the distal end part of the second cylinder. The first engagement portion is provided to an outer periphery of the second cylinder. The second engagement portion is configured to engage with the first engagement portion such that a circumferential position of the mounting structure relative to the second cylinder is selectively adjustable.

With the bicycle seatpost assembly in accordance with the first aspect, it is possible to adjust a rotational position of the bicycle saddle relative to the second cylinder.

In accordance with a second aspect of the present invention, the bicycle seatpost assembly according to the first aspect is configured so that the mounting structure includes an attachment member and a clamping member. The clamping member is configured to clamp the bicycle saddle between the clamping member and the attachment member.

In accordance with a third aspect of the present invention, the bicycle seatpost assembly according to the second aspect is configured so that the clamping member includes a bolt mounting part with which a bolt is to engage to clamp the bicycle saddle between the clamping member and the attachment member.

In accordance with a fourth aspect of the present invention, the bicycle seatpost assembly according to the second aspect is configured so that the clamping member includes a tubular part in which the distal end part of the second cylinder is provided. The second engagement portion is provided in an inner peripheral surface of the tubular part.

With the bicycle seatpost assembly in accordance with the fourth aspect, it is possible to fix the rotational position of the mounting structure relative to the second cylinder even if a clamping force between the clamping member and the attachment member is weak.

In accordance with a fifth aspect of the present invention, the bicycle seatpost assembly according to the first aspect is configured so that the second cylinder is telescopically movable relative to the first cylinder in an axial direction. One of the first engagement portion and the second engagement portion includes recesses extending in the axial direction. The other of the first engagement portion and the second engagement portion includes a projection. The projection is configured to be selectively provided in one of the recesses to position the mounting structure relative to the second cylinder at one of circumferential positions.

In accordance with a sixth aspect of the present invention, the bicycle seatpost assembly according to the first aspect is configured so that the second cylinder is telescopically movable relative to the first cylinder in an axial direction. The first engagement portion includes first projection and first recesses. The first projections are extending in the axial direction. The first recesses each are defined between adjacent two of the first projections. The second engagement portion includes second projections and second recesses. The second projections are extending in the axial direction. The second recesses each are defined between adjacent two of the second projections. The first projections are configured to be respectively provided in the second recesses. The second projections are configured to be respectively provided in the first recesses.

In accordance with a seventh aspect of the present invention, the bicycle seatpost assembly according to the second aspect is configured so that the mounting structure includes a mounting member having a mounting surface. The attachment member is mounted on the mounting surface.

In accordance with an eighth aspect of the present invention, the bicycle seatpost assembly according to the seventh aspect is configured so that the mounting surface has a curved shape.

In accordance with a ninth aspect of the present invention, the bicycle seatpost assembly according to the seventh aspect is configured so that the second cylinder is telescopically movable relative to the first cylinder in an axial direction. The clamping member is configured to be movable relative to the mounting member in the axial direction. The clamping member is configured to be rotatable together with the mounting member relative to the second cylinder in a circumferential direction of the second cylinder.

In accordance with a tenth aspect of the present invention, the bicycle seatpost assembly according to the ninth aspect is configured so that the mounting member includes a first positioning part. The clamping member includes a second positioning part configured to engage with the first positioning part. The clamping member is configured to be rotatable together with the mounting member relative to the second cylinder in the circumferential direction in a state where the second positioning part engages with the first positioning part.

In accordance with an eleventh aspect of the present invention, the bicycle seatpost assembly according to the tenth is configured so that the clamping member is configured to be movable relative to the mounting member in the axial direction in a state where the second positioning part engages with the first positioning part.

In accordance with a twelfth aspect of the present invention, the bicycle seatpost assembly according to the second aspect is configured so that the second cylinder is telescopically movable relative to the first cylinder in an axial direction. The clamping member is configured to be movable relative to the second cylinder in the axial direction between a first position and a second position. The second engagement portion is configured to engage with the first engagement portion to position the clamping member relative to the second cylinder in a circumferential direction of the second cylinder in a first state where the clamping member is disposed at the first position. The second engagement portion is configured to disengages from the first engagement portion so that the clamping member is rotatable relative to the second cylinder in the circumferential direction in a second state where the clamping member is disposed at the second position.

In accordance with a thirteenth aspect of the present invention, the bicycle seatpost assembly according to the seventh aspect is configured so that the second cylinder is telescopically movable relative to the first cylinder in an axial direction. The mounting member includes a groove extending in a circumferential direction of the second cylinder. The bicycle seatpost assembly further comprises a restricting member provided in the groove to restrict an axial movement of the mounting member relative to the second cylinder in the axial direction.

In accordance with a fourteenth aspect of the present invention, the bicycle seatpost assembly according to the tenth aspect is configured so that the first positioning part is in contact with the second positioning part in the axial direction in a state where the second engagement portion engages with the first engagement portion.

In accordance with a fifteenth aspect of the present invention, the bicycle seatpost assembly according to the second aspect is configured so that the first engagement portion engages with the second engagement portion in a state where the clamping member clamps the bicycle saddle between the clamping member and the attachment member.

In accordance with a sixteenth aspect of the present invention, the bicycle seatpost assembly according to the first aspect is configured so that the first engagement portion is provided at the distal end part of the second cylinder.

In accordance with a seventeenth aspect of the present invention, a bicycle seatpost assembly comprises a first cylinder, a second cylinder, a mounting structure, a first engagement portion, and a second engagement portion. The second cylinder is configured to be telescopically received in the first cylinder. The mounting structure is attached to a distal end part of the second cylinder. The mounting structure is configured to fixedly mount the bicycle seat to the distal end part of the second cylinder. The mounting structure includes an attachment member, a mounting member, and a clamping member. The attachment member is mounted on the mounting member. The clamping member is configured to clamp the bicycle saddle between the clamping member and the attachment member. The first engagement portion is provided to the second cylinder. The second engagement portion is provided to the clamping member. The second engagement member is configured to engage with the first engagement portion such that a circumferential position of the mounting structure relative to the second cylinder is selectively adjustable.

With the bicycle seatpost assembly in accordance with the seventeenth aspect, it is possible to stabilize the rotational position of the bicycle saddle relative to the second cylinder.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
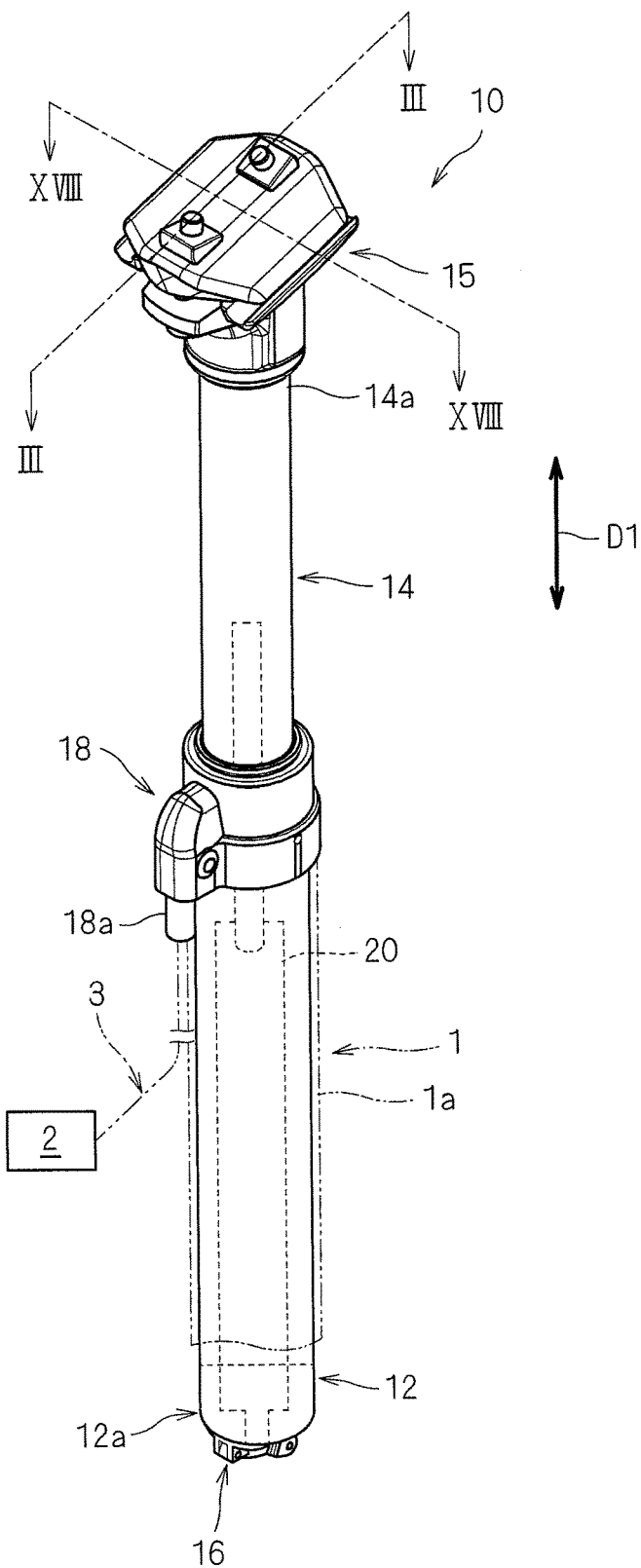
FIG. 1 is a perspective view of a bicycle seatpost assembly in accordance with an embodiment.

The embodiments will now be described with reference to the accompanying drawings, wherein like reference numerals designate corresponding or identical elements throughout the various drawings.

First Embodiment

FIG. 1 is a perspective view of a bicycle seatpost assembly 10 in accordance with a first embodiment. Referring initially to FIG. 1, the bicycle seatpost assembly 10 comprises a first cylinder 12 and a second cylinder 14. The second cylinder 14 is configured to be telescopically received in the first cylinder 12. The first cylinder 12 is detachably attached to a seat tube 1a of a bicycle frame 1.

The first cylinder 12 and the second cylinder 14 are configured to be movable relative to each other in a telescopic direction D1. In the first cylinder 12 and the second cylinder 14, a positioning structure 20 is provided. The positioning structure 20 is configured to relatively position the first cylinder 12 and the second cylinder 14 in the telescopic direction D1. The positioning structure 20 is configured to be operated via an operating device 2. For example, the operating device 2 is mounted on a bicycle handlebar. An actuation structure 16 is configured to actuate the positioning structure 20 and is disposed at a distal end 12a of the first cylinder 12. In the illustrated embodiment, the distal end 12a is a lower end of the first cylinder 12 in a state where the bicycle seatpost assembly 10 is attached to the seat tube 1a of the bicycle frame 1. The actuation structure 16 is operatively coupled to an operating device 2 via a control cable 3 such as a Bowden cable.

In the present application, the following directional terms "forward", "rearward", "left", "right", "upward" and "downward" as well as any other similar directional terms refer to those directions which are determined on the basis of the rider who sits on the bicycle saddle (not shown) of a bicycle with facing the bicycle handlebar (not shown).

Accordingly, these terms, as utilized to describe the bicycle seatpost assembly 10, should be interpreted relative to a bicycle equipped with the bicycle seatpost assembly 10 as used in an upright riding position on a horizontal surface.

The control cable 3 is pulled using the operating device 2, so that the actuation structure 16 is operated, and position of the second cylinder 14 relative to the first cylinder 12 is adjusted using the positioning structure 20.

As seen in FIG. 1, the bicycle seatpost assembly 10 further comprises an outer cover 18. The outer cover 18 is fixed to the first cylinder 12. The outer cover 18 includes a cable guiding portion 18*a* configured to guide and extract the control cable 3 downward.

Figure 2:
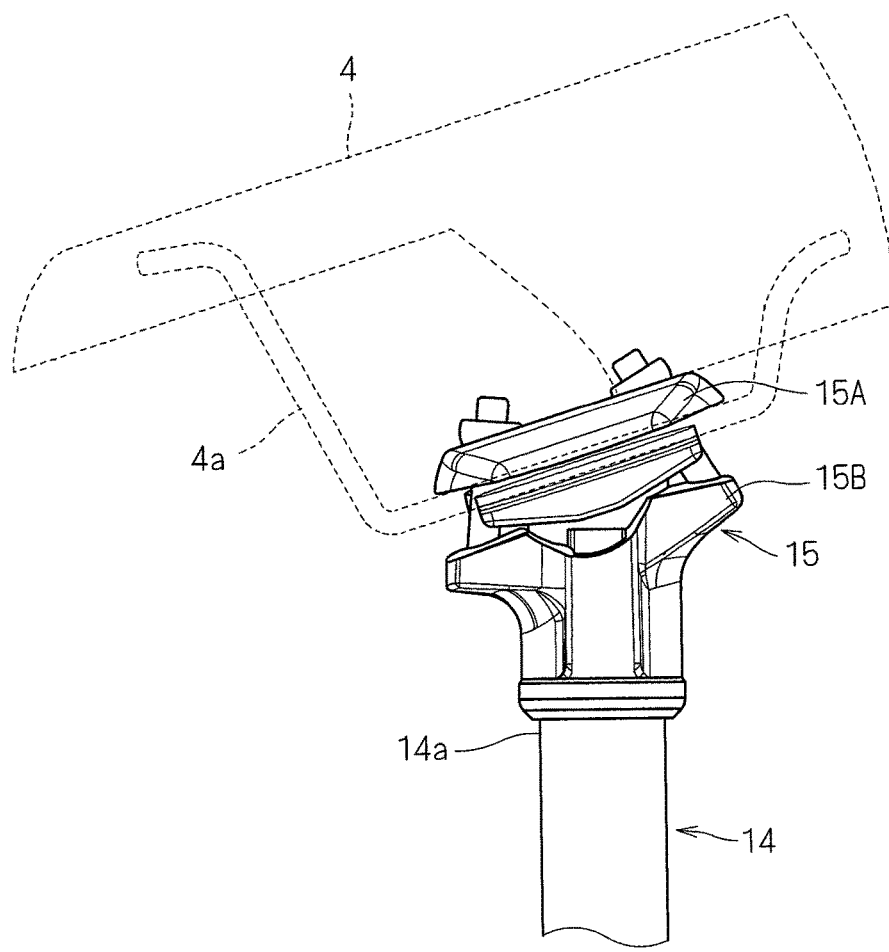
FIG. 2 is a side view of a mounting structure and a bicycle saddle.

As seen in FIG. 1, the bicycle seatpost assembly 10 comprises a mounting structure 15. The mounting structure 15 is attached to a distal end part 14*a* of the second cylinder 14. In the illustrated embodiment, the distal end part 14*a* is an upper end part of the second cylinder 14 in a state where the bicycle seatpost assembly 10 is attached to the seat tube 1*a* of the bicycle frame 1. FIG. 2 is a side view of the mounting structure 15 and a bicycle saddle 4. As seen in FIG. 2, the mounting structure 15 is configured to fixedly mount the bicycle saddle 4 to the distal end part 14*a* of the second cylinder 14. The mounting structure 15 is configured to support the bicycle saddle 4. The bicycle saddle 4 is fixed to the upper end part of the second cylinder 14 through the mounting structure 15.

Figure 3:
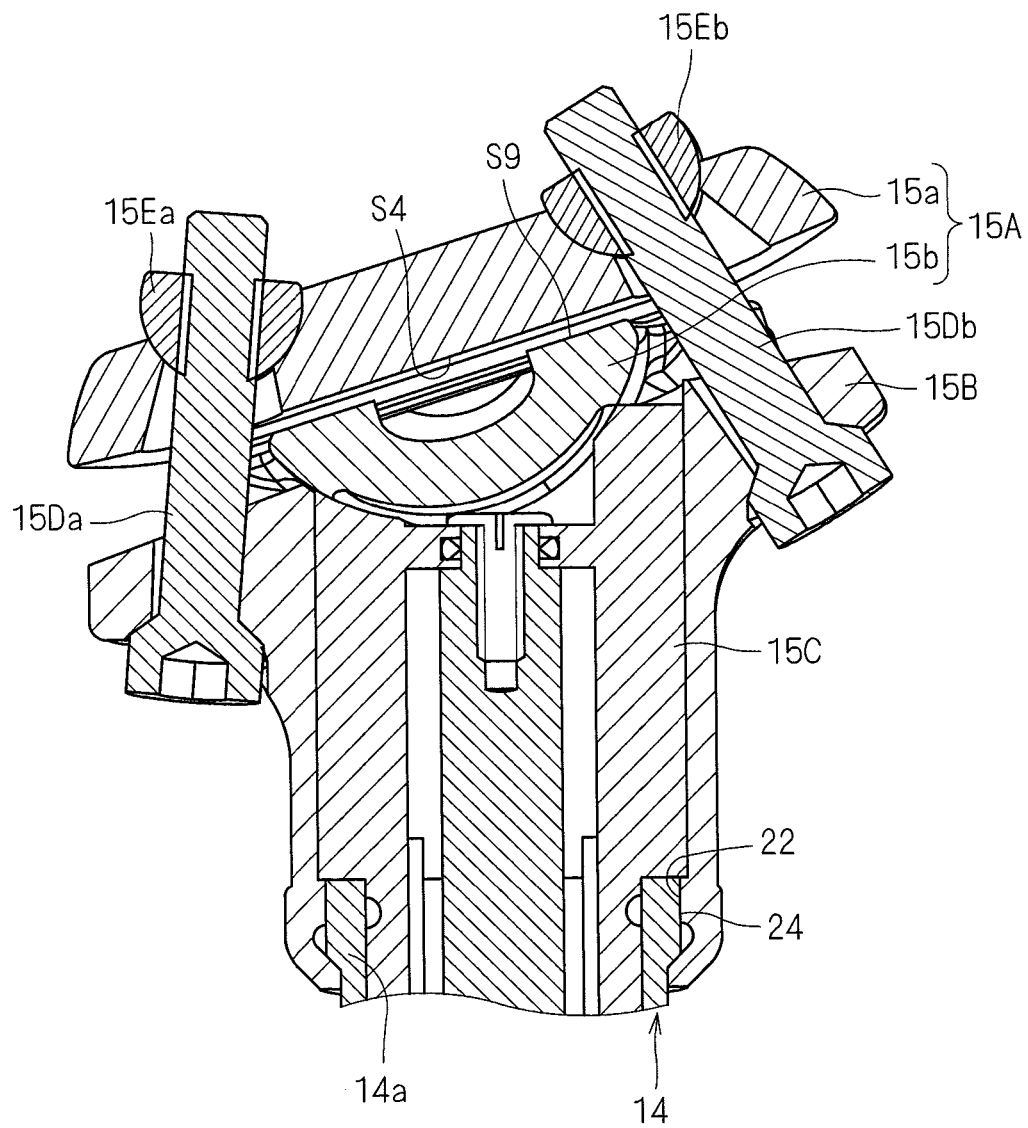
FIG. 3 is a cross-sectional view of the mounting structure.

FIG. 3 is a cross-sectional view of the mounting structure 15 illustrated in FIGS. 1 and 2. FIG. 3 is the cross-sectional view taken along line in FIG. 1. As seen in FIG. 3, the mounting structure 15 includes an attachment member 15A and a clamping member 15B. The clamping member 15B is configured to clamp the bicycle saddle 4 between the clamping member 15B and the attachment member 15A. The mounting structure 15 includes a mounting member 15C. The attachment member 15A is mounted on the mounting member 15C. Also, the mounting structure 15 includes bolts 15Da and 15Db and nuts 15Ea and 15Eb.

At first, constitutions of each component in the bicycle seatpost assembly 10 will be described below.

As seen in FIG. 3, the attachment member 15A includes a first attachment member 15*a* and a second attachment member 15*b*. In an assembled state of the attachment member 15A, the first attachment member 15*a* is provided above the second attachment member 15*b*.

Figure 4:
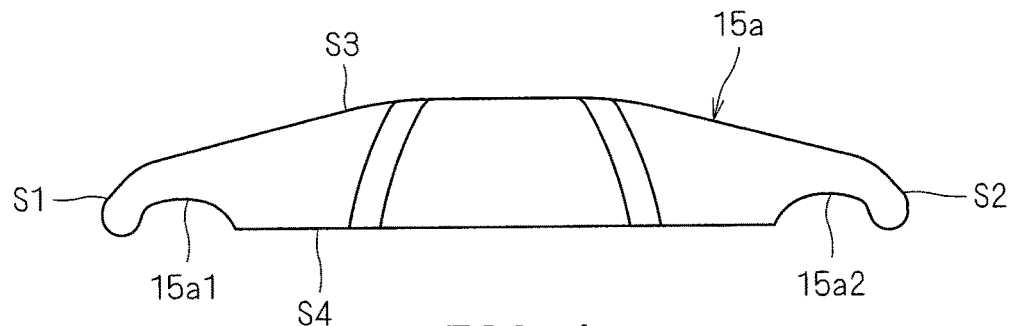
FIG. 4 is a front view of a first attachment member.
Figure 5:
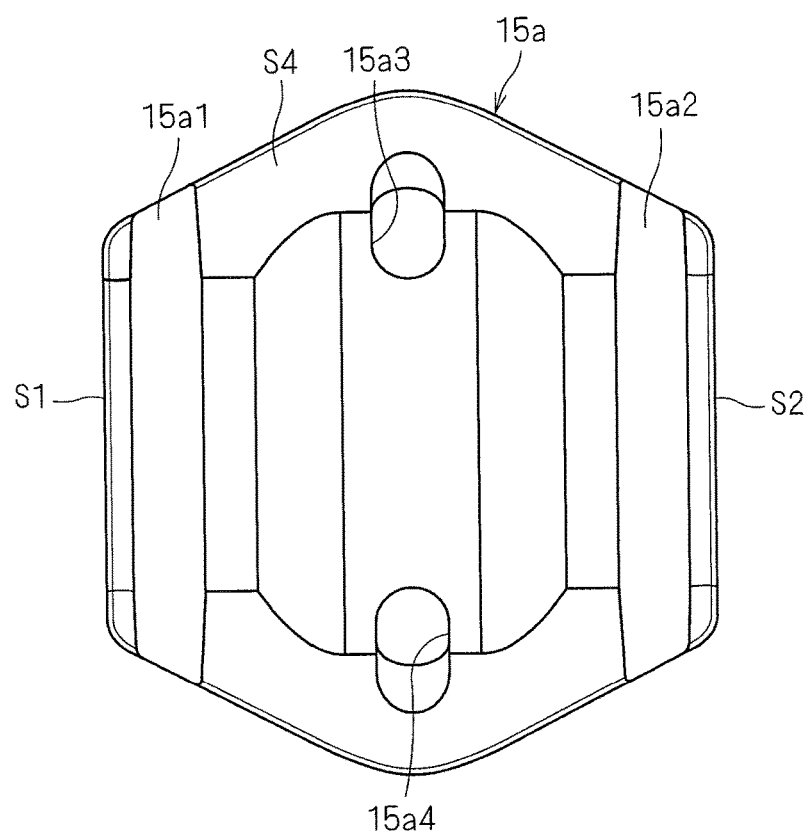
FIG. 5 is a plan view of the first attachment member.

FIG. 4 is a front view of the first attachment member 15*a*, and FIG. 5 is a plan view of the first attachment member 15*a*. FIG. 5 depicts the first attachment member 15*a* viewed from the second attachment member 15*b* in FIG. 3. As shown in FIGS. 4 and 5, the first attachment member 15*a* has a first end side S1 and a second end side S2. The first end side S1 is opposite to the second end side S2. The first attachment member 15*a* has an upper surface S3 and a lower surface S4. The upper surface S3 is opposite to the lower surface S4.

The first attachment member 15*a* includes a first groove 15*a*1 and a second groove 15*a*2. As seen in FIGS. 4 and 5, the first groove 15*a*1 and the second groove 15*a*2 are provided on the lower surface S4 of the first attachment member 15*a*. The first groove 15*a*1 is provided at the first end side S1, and the second groove 15*a*2 is provided at the second end side S2. The first groove 15*a*1 is parallel to the second groove 15*a*2.

The first attachment member 15*a* includes a first hole 15*a*3 and a second hole 15*a*4. The first hole 15*a*3 and the second hole 15*a*4 are extending from the upper surface S3 to the lower surface S4. The first hole 15*a*3 and the second hole 15*a*4 are provided at a center area between the first end side S1 and the second end side S2. The first hole 15*a*3 and the second hole 15*a*4 are arranged in a longitudinal direction of the first groove 15*a*1 (or the second groove 15*a*2).

As seen in FIG. 4, the center area of the first attachment member 15*a* is thicker than the first end side S1 and the second end side S2 of the first attachment member 15*a*.

Figure 6:
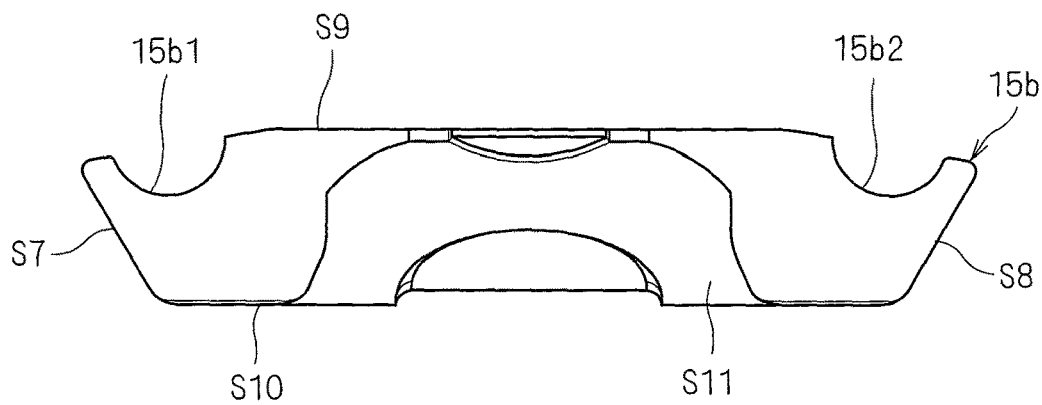
FIG. 6 is a front view of a second attachment member.
Figure 7:
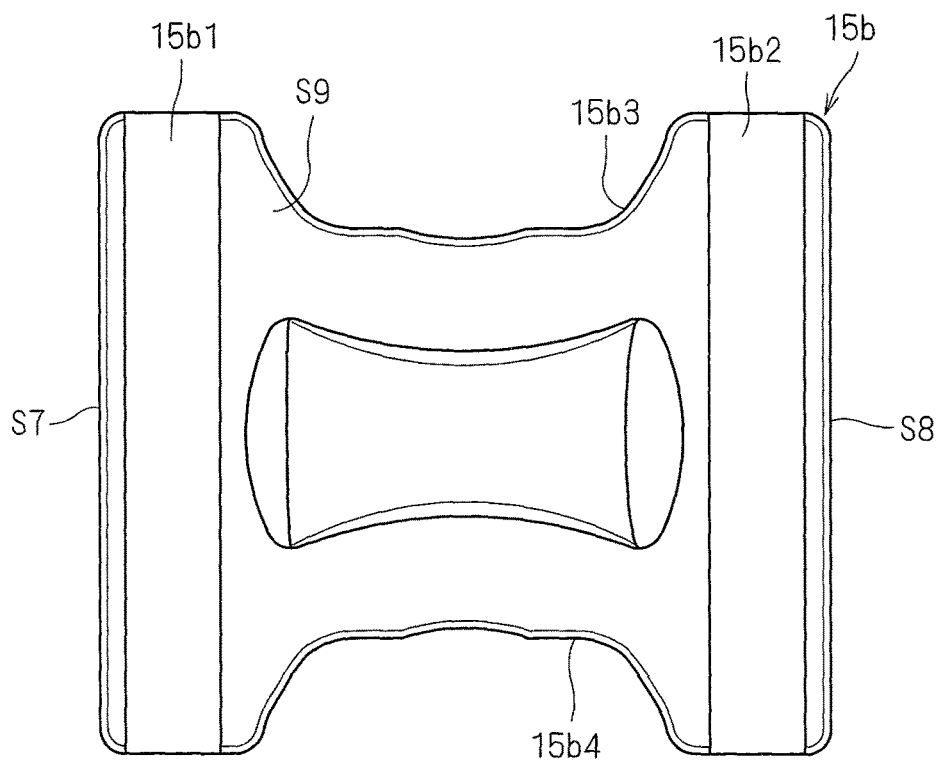
FIG. 7 is a plan view of the second attachment member.
Figure 8:
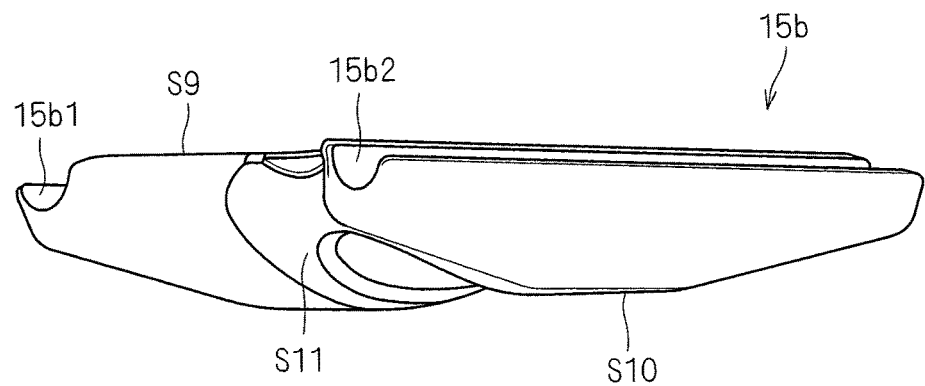
FIG. 8 is a perspective view of the second attachment member.

FIG. 6 is a front view of the second attachment member 15*b*. FIG. 7 is a plan view of the second attachment member 15*b*. FIG. 8 is a perspective view of the second attachment member 15*b*. FIG. 7 depicts the second attachment member 15*b* viewed from the first attachment member 15*a* in FIG. 3. As shown in FIGS. 6 and 7, the second attachment member 15*b* has a third end side S7 and a fourth end side S8. The third end side S7 is opposite to the fourth end side S8. The second attachment member 15*b* has an upper surface S9 and a lower surface S10. The upper surface S9 is opposite to the lower surface S10.

The second attachment member 15*b* includes a third groove 15*b*1 and a fourth groove 15*b*2. As seen in FIGS. 6, 7, and 8, the third groove 15*b*1 and the fourth groove 15*b*2 are provided on the upper surface S9 of the second attachment member 15*b*. The third groove 15*b*1 is provided at the third end side S7, and the fourth groove 15*b*2 is provided at the fourth end side S8. The third groove 15*b*1 is parallel to the fourth groove 15*b*2.

The second attachment member 15*b* includes a first notch 15*b*3 and a second notch 15*b*4. The first notch 15*b*3 and the second notch 15*b*4 are provided at least at a center area between the third end side S7 and the fourth end side S8. The first notch 15*b*3 is opposite to the second notch 15*b*4.

As seen in FIG. 8, the second attachment member 15*b* has a convex curved surface S11. The convex curved surface S11 is provide on the lower surface S10 of the second attachment member 15*b*. The convex curved surface S11 is projected downward.

Referring to FIGS. 2 and 3, in the assembled state of the attachment member 15A, the upper surface S9 of the second attachment member 15*b* faces the lower surface S4 of the first attachment member 15*a*. Each of rails 4*a* of the bicycle saddle 4 is provided between the first attachment member 15*a* and the second attachment member 15*b*. Namely, a first rail 4*a* is provided between the first groove 15*a*1 and the third groove 15*b*1, and a second rail 4*a* is provided between the second groove 15*a*2 and the fourth groove 15*b*2.

Figure 9:
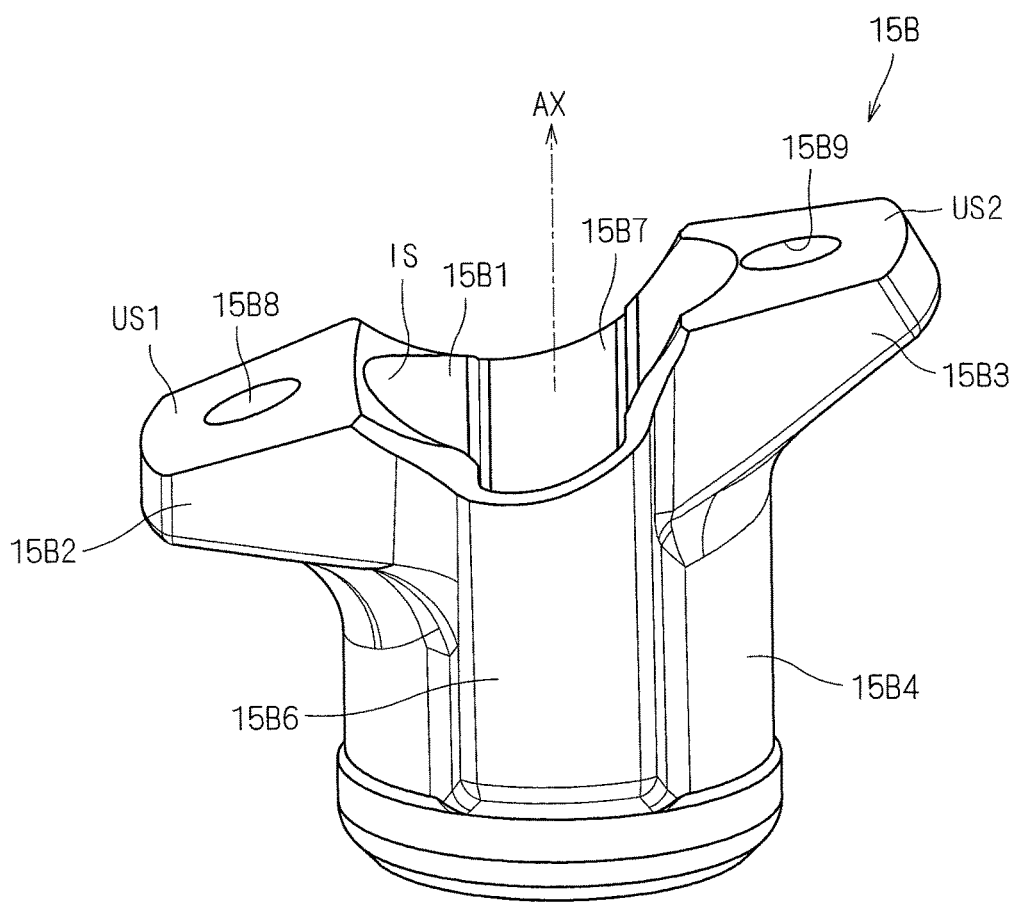
FIG. 9 a perspective view of a clamping member.
Figure 10:
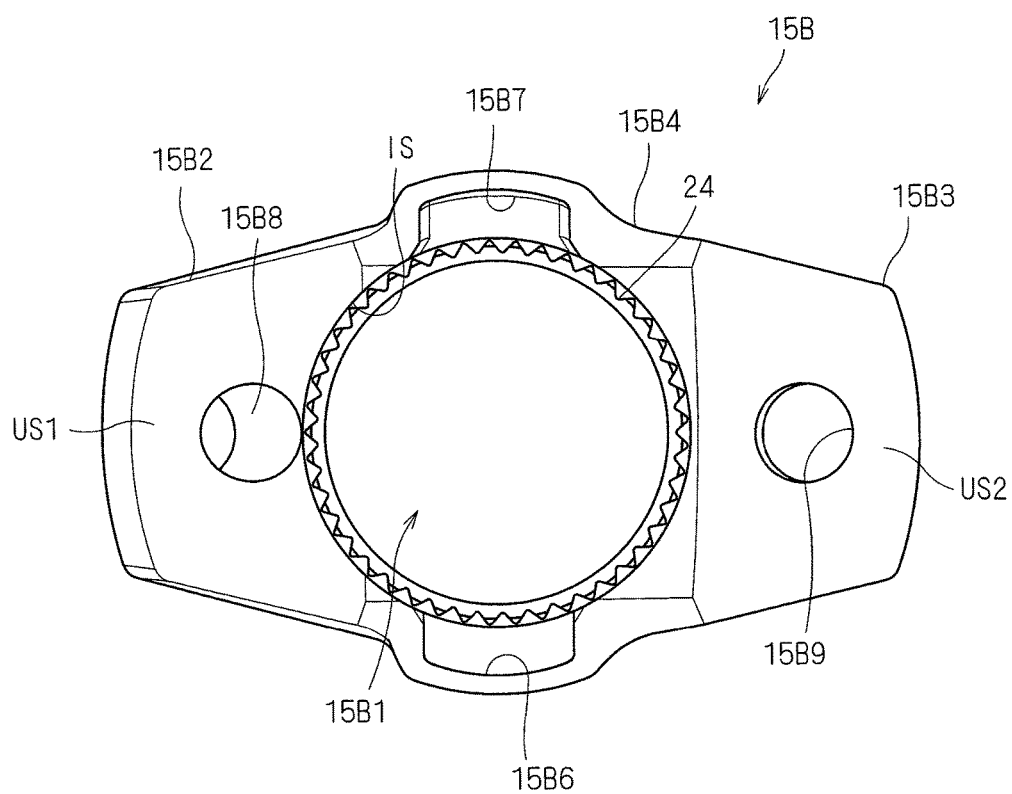
FIG. 10 is a plan view of the clamping member.

FIG. 9 is a perspective view of the clamping member 15B, FIG. 10 is a plan view of the clamping member 15B. FIG. 10 depicts the clamping member 15B viewed from the attachment member 15A in FIG. 3. The clamping member 15B has a hole 15B1 vertically extending in the clamping member 15B. The clamping member 15B includes a bolt mounting part 15B2 and 15B3 with which a bolt is to engage to clamp the bicycle saddle 4 between the clamping member 15B and the attachment member 15A. The clamping member 15B includes a tubular part 15B4 in which the distal end part 14*a* of the second cylinder 14 is provided. The clamping member 15B includes a second positioning part 15B6 and 15B7.

For example, the tubular part 15B4 is a cylinder. The bolt mounting part is provided to an upper part of the tubular part 15B4. The bolt mounting part 15B2 and 15B3 has a first flange 15B2 and a second flange 15B3. The first flange 15B2 has an upper surface US1, and the second flange 15B3 has an upper surface US2. As seen in FIG. 9, a position of the upper surface US2 is higher than a position of an upper surface US1 based on a bottom of the tubular part 15B4. The first flange 15B2 has a third hole 15B8, the second flange 15B3 has a fourth hole 15B9. The third hole 15B8 is extending in the first flange 15B2 in a thickness direction of the first flange 15B2 (up-and-down direction). The fourth hole 15B9 is extending in the second flange 15B3 in a thickness direction of the second flange 15B3 (up-and-down directions).

The second positioning part has a first recessed part 15B6 and a second recessed part 15B7. The first recessed part 15B6 and the second recessed part 15B7 are provided to a side part of the tubular part 15B4, more specifically, the first recessed part 15B6 and the second recessed part 15B7 are provided on an inner peripheral surface IS (see, FIG. 10). The first recessed part 15B6 is opposite to the second recessed part 15B7. The first recessed part 15B6 and the second recessed part 15B7 are extending in an axial direction AX. The first recessed part 15B6 and the second recessed part 15B7 are extending from the upper part of the tubular part 15B4 to a middle position of the tubular part 15B4. The middle position is defined between the upper part of the tubular part 15B4 and the bottom of the tubular part 15B4. Namely, the middle position does not reach to the bottom of the tubular part 15B4. The axial direction AX is parallel to the telescopic direction D1.

Figure 11:
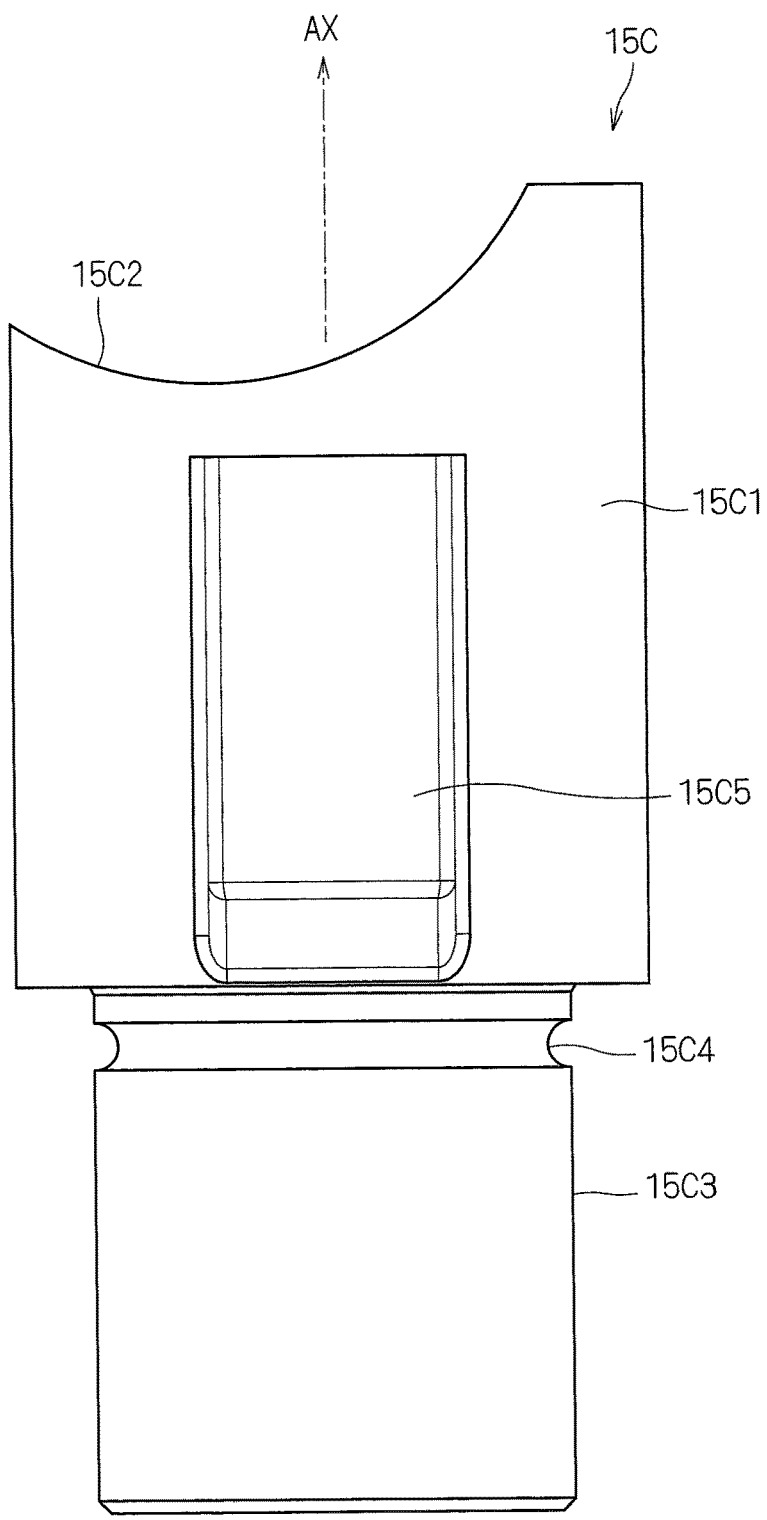
FIG. 11 a side view of a mounting member.
Figure 12:
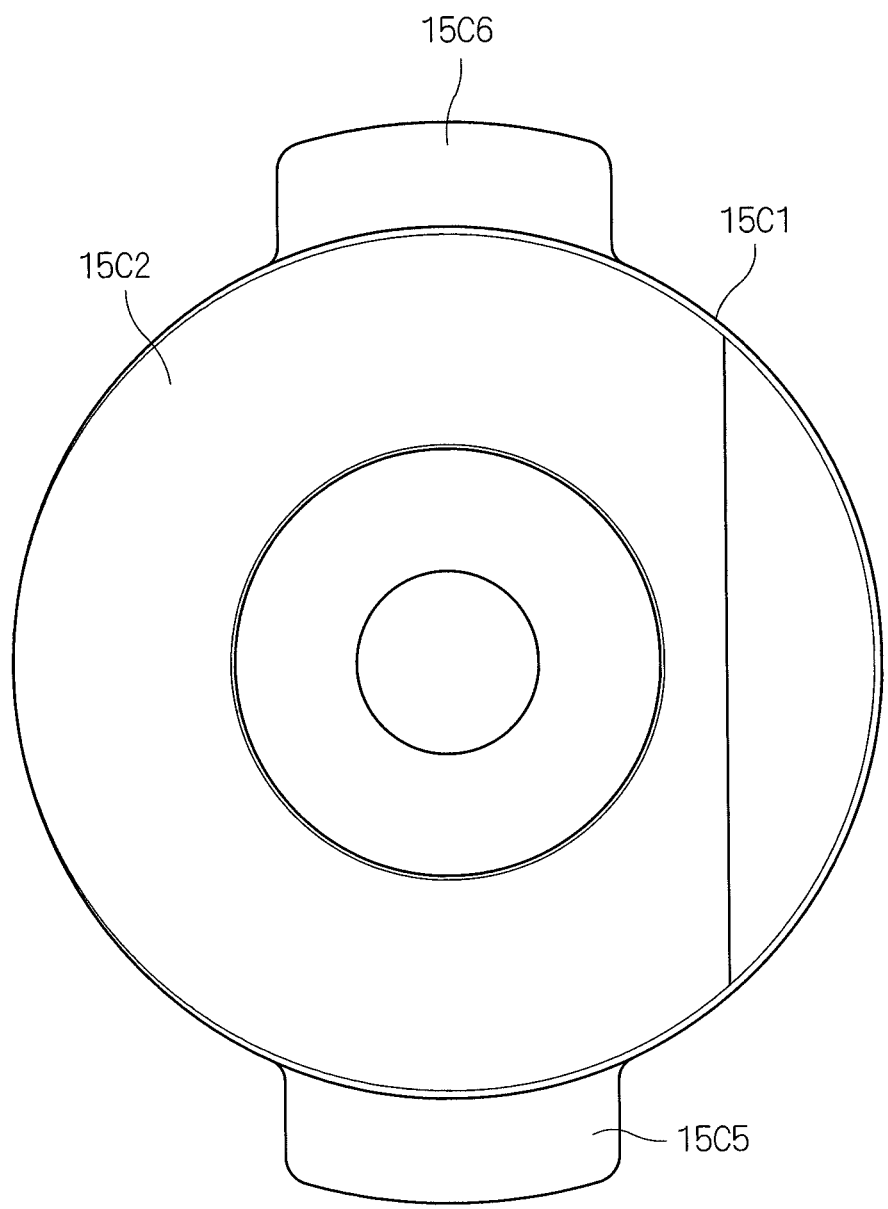
FIG. 12 is a plan view of the mounting member.

FIG. 11 a side view of the mounting member 15C, FIG. 12 is a plan view of the mounting member 15C. FIG. 12 depicts the mounting member 15C viewed from the attachment member 15A in FIG. 3. The mounting member 15C includes a mounting portion 15C1 and an insertion part 15C3. The attachment member 15A is mounted on the mounting portion 15C1, and the insertion part 15C3 is provided in the second cylinder 14.

For example, each of the mounting portion 15C1 and the insertion part 15C3 is a cylinder, and a diameter of the mounting portion 15C1 is larger than a diameter of the insertion part 15C3. The mounting portion 15C1 and the insertion part 15C3 are arranged in the axial direction AX, a bottom part of the mounting portion 15C1 is connected to an upper part of the insertion part 15C3. In the illustrated embodiment, the mounting portion 15C1 is integrally provided with the insertion part 15C3.

The mounting member 15C has a mounting surface 15C2. More specifically, the mounting surface 15C2 is provide to an upper part of the mounting portion 15C1. The attachment member 15A is mounted on the mounting surface 15C2. As shown in FIG. 11, the mounting surface 15C2 has a curved shape. In the illustrated embodiment, the mounting surface 15C2 comprises a concave shape recessed from the upper part of the mounting portion 15C1. More specifically, the mounting surface 15C2 is a complementary shape to the convex curved surface S11 to engage with one another. The convex curved surface S11 is mounted on the mounting surface 15C2. It is possible to adjust an attachment position of the attachment member 15A relative to the mounting member 15C by sliding of the convex curved surface S11 on the mounting surface 15C2. The convex curved surface S11 and the mounting surface 15C2 have substantially the same curvature, if needed and/or desired.

The mounting member 15C includes a first positioning part 15C5 and 15C6. The second positioning part is configured to engage with the first positioning part 15B6 and 15B7. The first positioning part has a first protruding part 15C5 and a second protruding part 15C6. The first recessed part 15B6 is configured to engage with the first protruding part 15C5, and the second recessed part 15B7 is configured to engage with the second protruding part 15C6.

The first protruding part 15C5 and the second protruding part 15C6 are provided to side part of the mounting portion 15C1, more specifically, The first protruding part 15C5 and the second protruding part 15C6 are provided on an outer peripheral surface of the mounting portion 15C1 (see, FIGS. 11 and 12). The first protruding part 15C5 is opposite to the second protruding part 15C6 with respect to a center of the mounting portion 15C1. The first protruding part 15C5 and the second protruding part 15C6 are extending in the axial direction AX. The first protruding part 15C5 and the second protruding part 15C6 are extending from the bottom part of the mounting portion 15C1 to a middle position. The middle position is defined between the upper part of the mounting portion 15C1 and the bottom of the mounting portion 15C1. Namely, the middle position does not reach to the upper part of the mounting portion 15C1.

The mounting member 15C includes a groove 15C4 extending in a circumferential direction of the second cylinder 14. As shown in FIG. 11, the groove 15C4 is provided on an outer peripheral surface of the insertion part 15C3.

Figure 13:
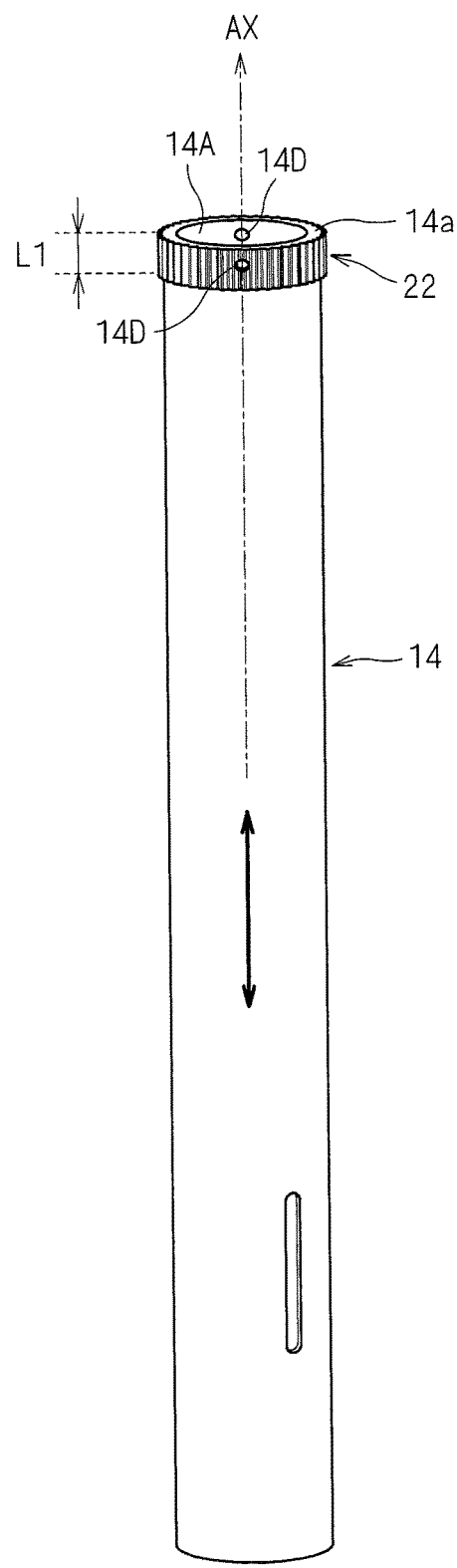
FIG. 13 is a perspective view of a second cylinder.

The bicycle seatpost assembly 10 comprises a first positioning part 15C5 and 15C6 and a second positioning part 15B6 and 15B7. FIG. 13 is a perspective view of the second cylinder 14, FIG. 14 is a plan view of the second cylinder 14, and FIG. 15 is a perspective view of the clamping member 15B.

Figure 14:
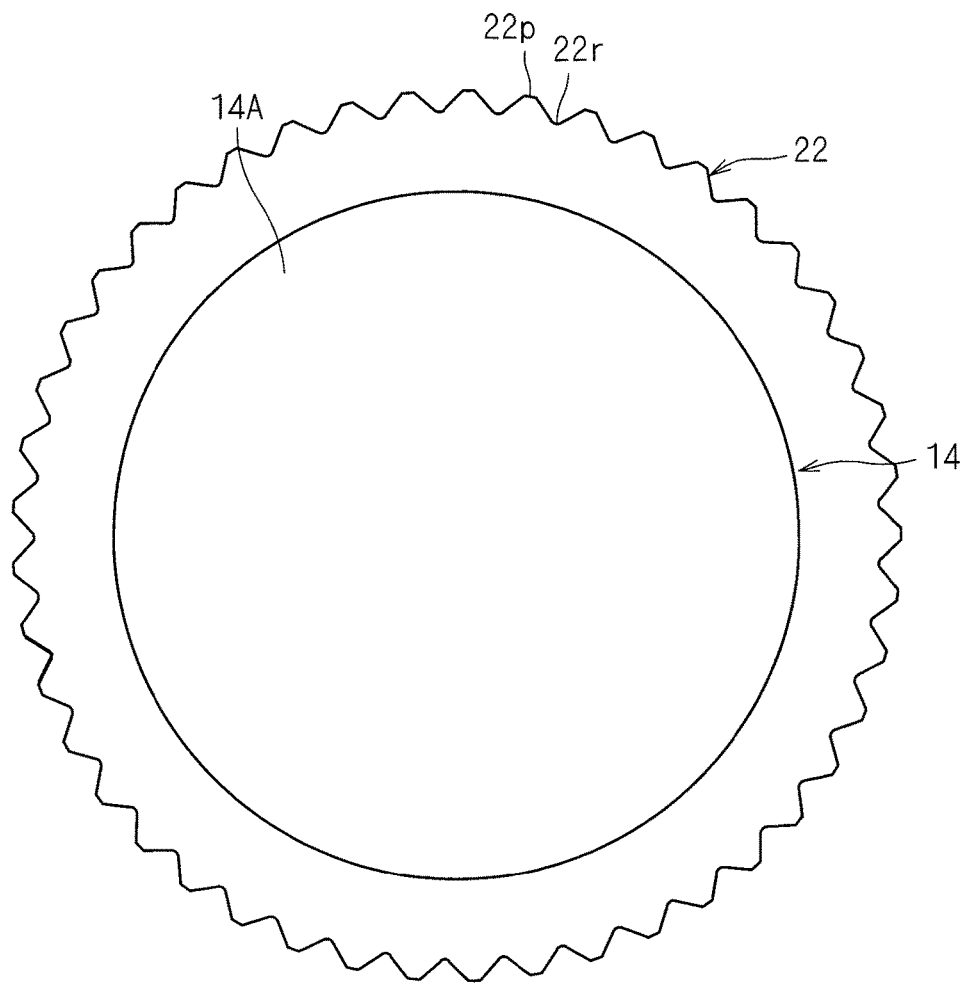
FIG. 14 is a plan view of the second cylinder.
Figure 15:
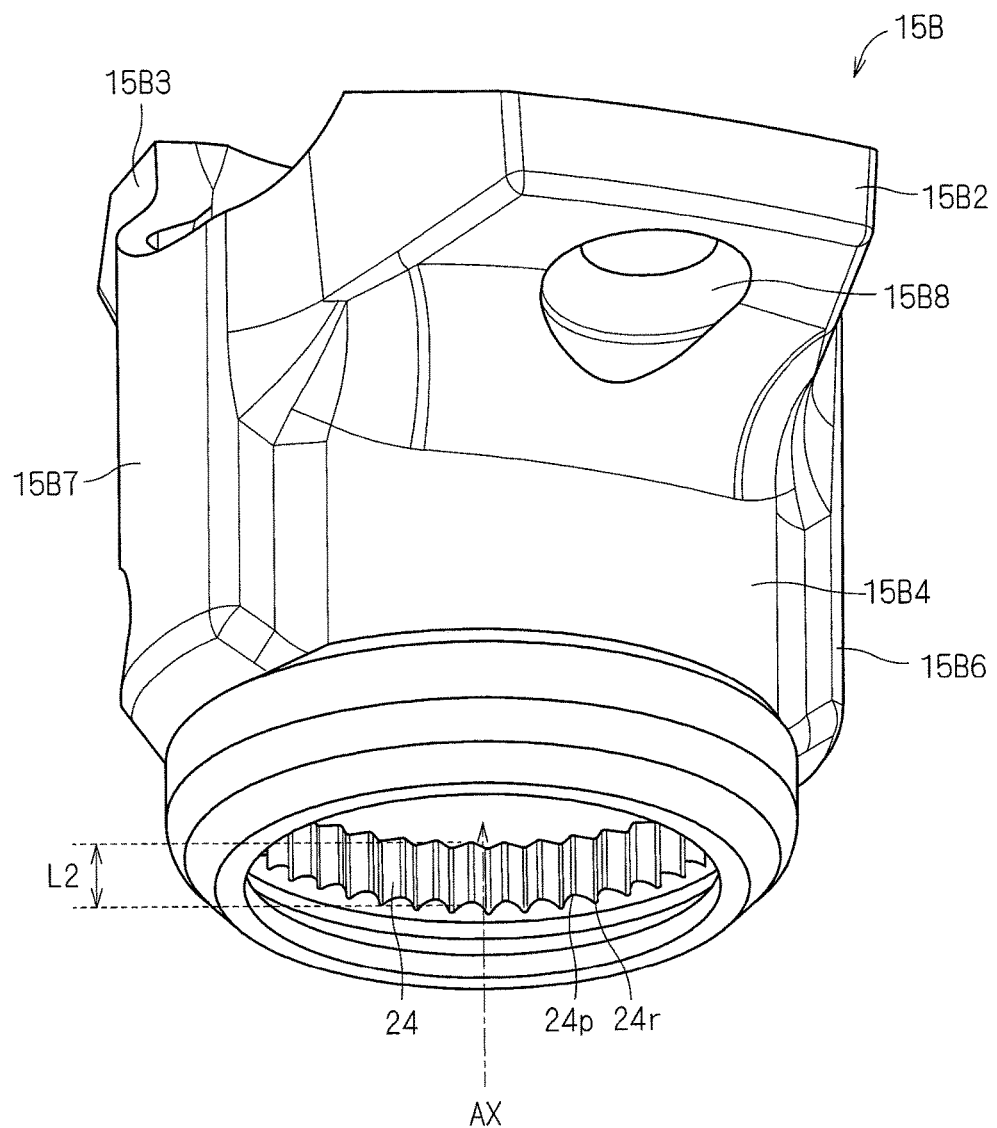
FIG. 15 is a perspective view of the clamping member.

As seen in FIGS. 13 and 14, the first engagement portion 22 is provided to the second cylinder 14. The first engagement portion 22 is provided to an outer periphery of the second cylinder 14. More specifically, the first engagement portion 22 is provided at the distal end part 14a of the second cylinder 14. As seen in FIGS. 10 and 15, the second engagement portion 24 is provided to the clamping member 15B. The second engagement portion 24 is provided in the inner peripheral surface IS of the tubular part 15B4. Also, the second engagement portion 24 is provided at a bottom side of the tubular part 15B4.

The second cylinder 14 is telescopically movable relative to the first cylinder 12 in the axial direction AX. As shown in FIGS. 13 and 14, the first engagement portion 22 includes first projections 22p extending in the axial direction AX, and first recesses 22r each defined between adjacent two of the first projections 22p. The first projections 22p is extending from a distal upper end of the second cylinder 14 and has a predetermined length L1 in the axial direction AX. As shown in FIGS. 10 and 15, the second engagement portion 24 includes second projections 24p extending in the axial direction AX, and second recesses 24r each defined between adjacent two of the second projections 24p. The second projections 24p is extending from a distal bottom end of the tubular part 15B4 and has a predetermined length L2 in the axial direction AX. For example, the predetermined length L1 is equal to the predetermined length L2.

The second engagement portion 24 is configured to engage with the first engagement portion 22 such that a circumferential position of the mounting structure 15 relative to the second cylinder 14 is selectively adjustable. The first projections 22p are configured to be respectively provided in the second recesses 24r, and the second projections 24p are configured to be respectively provided in the first recesses 22r.

Figure 16:
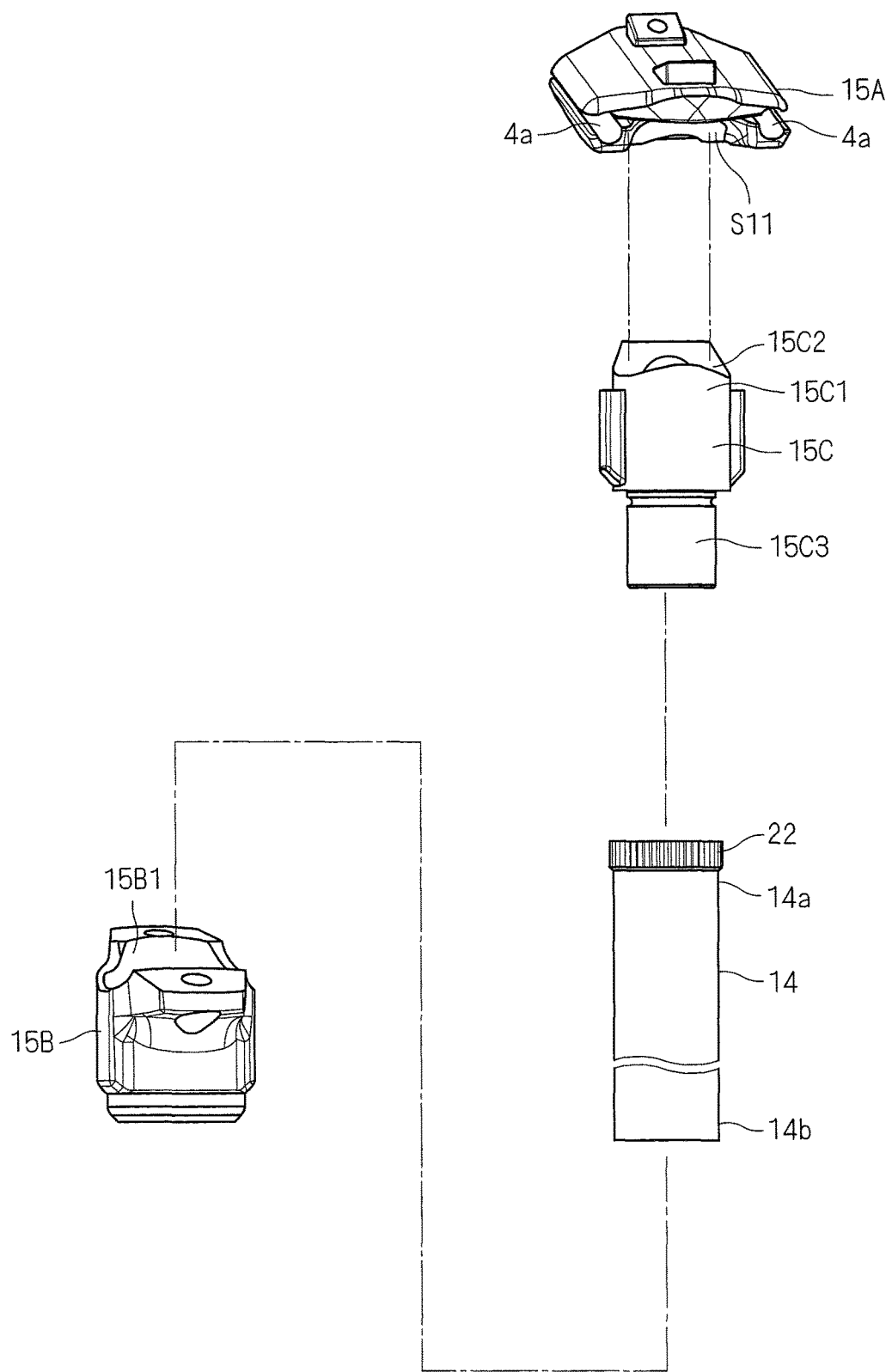
FIGS. 16 and 17 are disassembled perspective views of the bicycle seatpost assembly.
Figure 17:
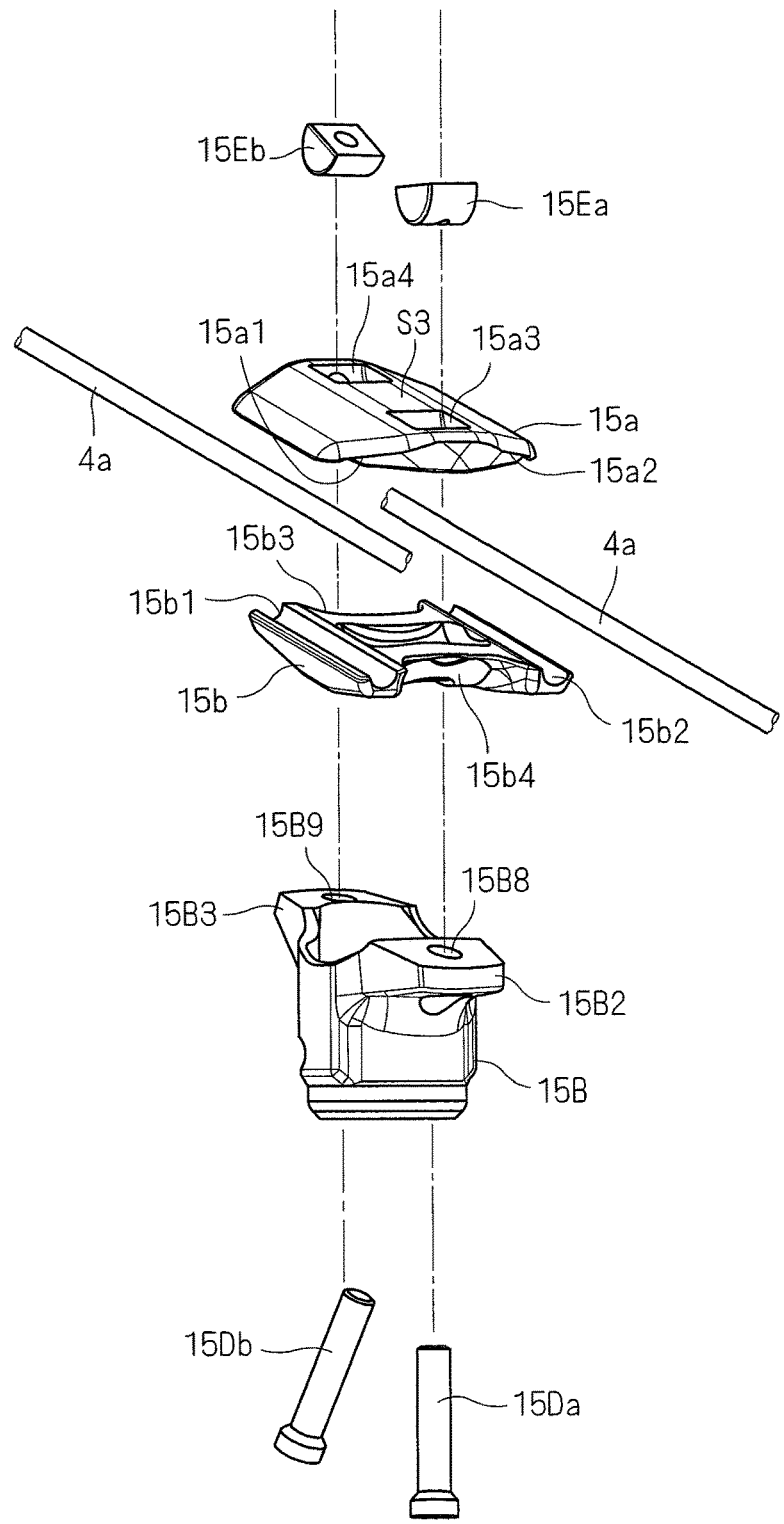

Next, a method for assembling the mounting structure 15 to the second cylinder 14 will be describe referring to FIGS. 16 and 17.

As shown in FIG. 16, a lower end part 14b of the second cylinder 14 is inserted in the hole 15B1 of the clamping member 15B, and the clamping member 15B is positioned to the upper end part 14a of the second cylinder 14. The insertion part 15C3 of the mounting member 15C is inserted in a through hole 14A (see, FIG. 14) of the second cylinder 14 at upper end part 14a so that the bottom part of the mounting portion 15C1 contacts with the upper end part 14a of the second cylinder 14. The convex curved surface S11 of the second attachment member 15b is put on the mounting surface 15C2 of the mounting member 15C.

On the other hand, as shown in FIG. 17, the first rail 4a and second rail 4a of the bicycle saddle 4 interpose between the first attachment member 15a and the second attachment member 15b so that the first rail 4a is positioned between the first groove 15a1 and the third groove 15b1 and the second rail 4a is positioned between the second groove 15a2 and the fourth groove 15b2. Front and rear position of the first and second rail 4a, 4a (i.e. the position of the saddle 4), is adjusted along a longitudinal direction of the first, second, third and fourth grooves 15a1, 15a2, 15b1 and 15b2. The nuts 15Ea and 15Eb are placed on the upper surface S3 of the first attachment member 15a. A first bolt 15Da is inserted through the third hole 15B8 of the clamping member 15B, the second notch 15b4 of the second attachment member 15b, the first hole 15a3 of the first attachment member 15a, and a first nut 15Ea. A second bolt 15Db is inserted through the fourth hole 15B9 of the clamping member 15B, the first notch 15b3 of the second attachment member 15b, the second hole 15a4 of the first attachment member 15a, and a second nut 15Eb. The rails 4a of the bicycle saddle 4 are clamped between the clamping member 15B and the attachment member 15A by fastening the bolts 15Da and 15Db.

As described above, to clamp the bicycle saddle 4 between the clamping member 15B and the attachment member 15A, the bolts 15Da and 15Db are to engage with the bolt mounting part 15B2 and 15B3 of the clamping member 15B.

Figure 18:
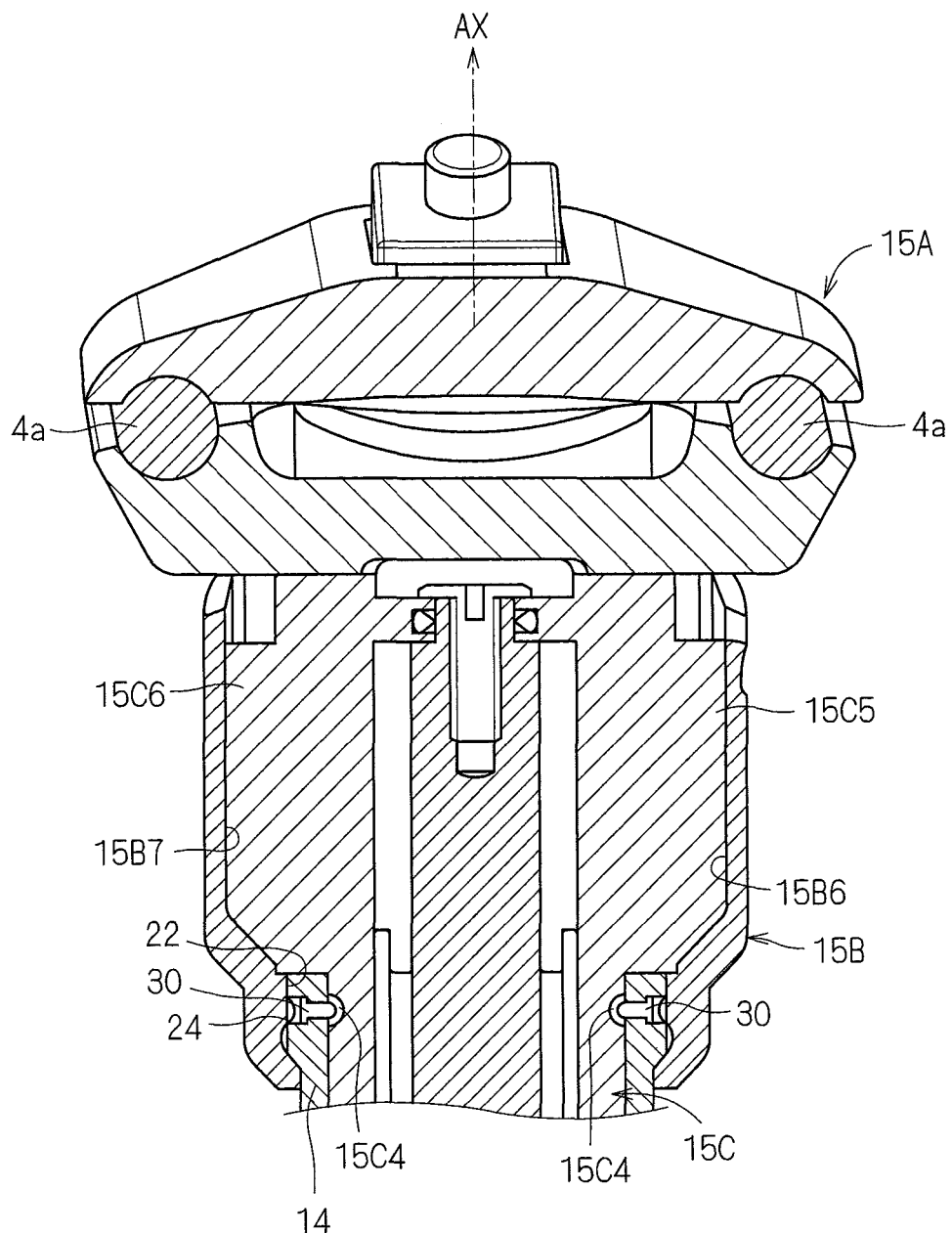
FIG. 18 is a cross-sectional view of the mounting structure.

Next, an assembled state of the mounting structure 15 will be described below. FIG. 18 is a cross-sectional view of the mounting structure 15. FIG. 18 is the cross-sectional view taken along XVIII-XVIII line in FIG. 1.

FIGS. 3 and 18 show an assembled state of the mounting structure 15. The first engagement portion 22 engages with the second engagement portion 24 in a state where the clamping member 15B clamps the bicycle saddle 4 between the clamping member 15B and the attachment member 15A. Namely, in assembled state of the mounting structure 15, the first engagement portion 22 provided to the second cylinder 14 is engaged with the second engagement portion 24 provided to the clamping member 15B. With the engagement of the first engagement portion 22 and the second engagement portion 24, a rotational movement of the clamping member 15B relative to the second cylinder 14 about the circumferential direction is prevented. Therefore, the mounting structure 15 is fixed to the upper end part 14a of the second cylinder 14 at a selectively adjusted circumferential position of the mounting structure 15 relative to the second cylinder 14.

As shown in FIGS. 3 and 18, in the assembled state of the mounting structure 15, the first recessed part 15B6 of the clamping member 15B is engaged with the first protruding part 15C5 of the mounting member 15C and the second recessed part 15B7 of the clamping member 15B is engaged with the second protruding part 15C6 of the mounting member 15C.

The first positioning part 15C5 and 15C6 is in contact with the second positioning part 15B6 and 15 B7 in the axial direction AX in the state where the second engagement portion 22 engages with the first engagement portion 24. Namely, in the assembled state of the mounting structure 15, the first protruding part 15C5 of the mounting member 15C is in contact with the first recessed part 15B6 of the clamping member 15B in the axial direction AX and the second protruding part 15C6 of the mounting member 15C is in contact with the second recessed part 15B7 of the clamping member 15B in the axial direction AX. More specifically, as shown in FIG. 18, in the assembled state of the mounting structure 15, a bottom part of the first protruding part 15C5 is in contact with a bottom part of the first recessed part 15B6 and a bottom part of the second protruding part 15C6 is in contact with a bottom part of the second recessed part 15B7. Therefore, it is possible to restrict an upward movement of the clamping member 15B relative to the second cylinder 14 in the axial direction AX.

Figure 19:
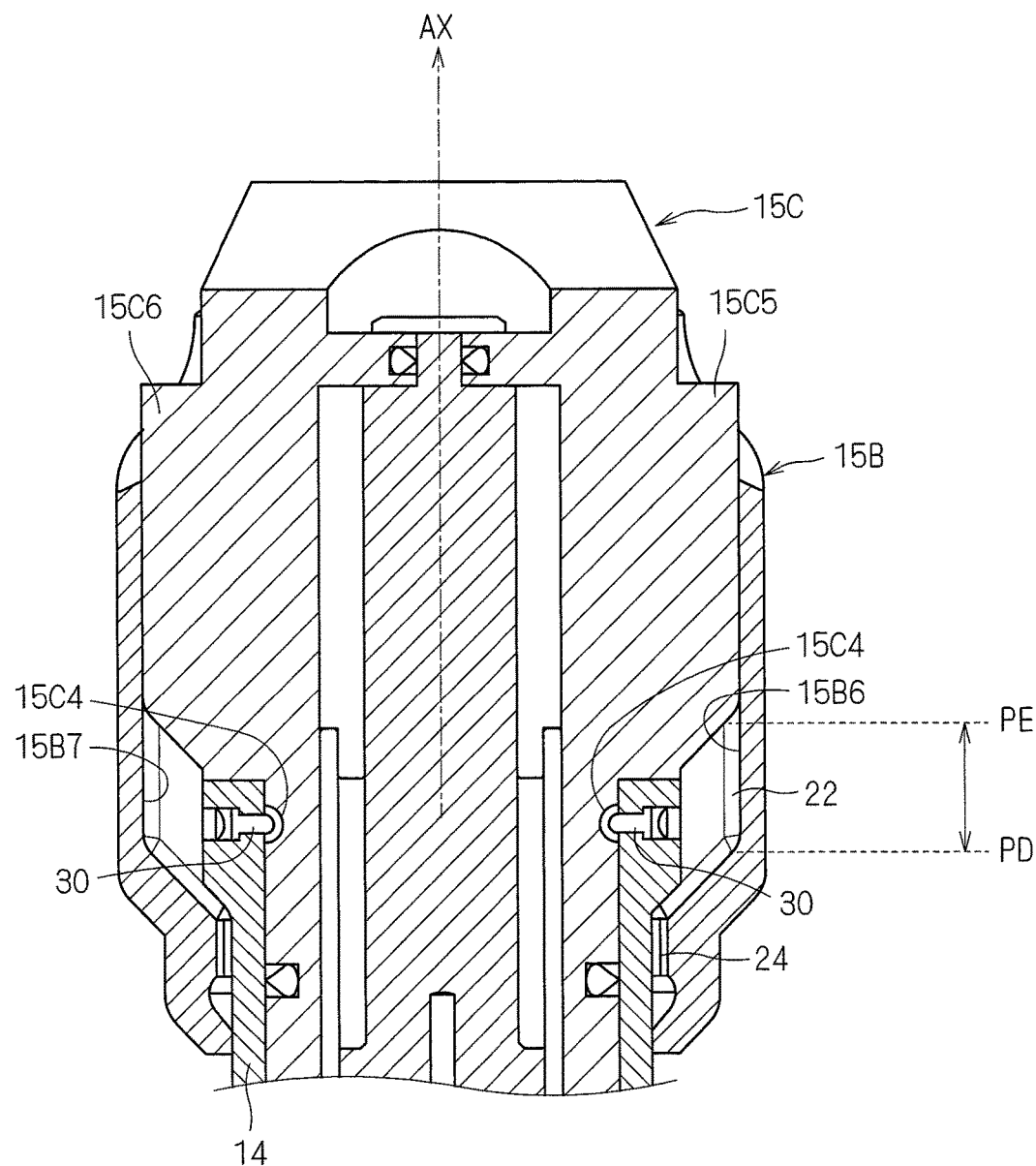
FIG. 19 is a cross-sectional view of the camping member and the mounting member.

FIG. 19 is a cross-sectional view of the clamping member 15B and the mounting member 15C. FIG. 19 shows that the attachment member 15A is removed from a structure in FIG. 18. In FIG. 19, the clamping member 15B moves from a first position PE to a second position PD.

As shown in FIG. 19, the clamping member 15B is configured to be movable relative to the mounting member 15C in the axial direction AX. In other words, the clamping member 15B is configured to be movable relative to the second cylinder 14 in the axial direction AX between the first position PE and the second position PD. As described later, an axial movement of the mounting member 15C relative to the second cylinder 14 in the axial direction AX is restricted. Therefore, the clamping member 15B is configured to be movable relative to the mounting member 15C in the axial direction AX in a state where the second positioning part 15B6 and 15B7 engages with the first positioning part 15C5 and 15C6. On the other hand, the clamping member 15B is configured to be rotatable together with the mounting member 15C relative to the second cylinder 14 in the circumferential direction of the second cylinder 14. Namely, the clamping member 15B is rotatable together with the mounting member 15C relative to the second cylinder 14 in the circumferential direction of the second cylinder 14 in a state where the clamping member is positioned to the second position PD.

In a state where the clamping between the clamping member 15B and the attachment member 15A is released, the clamping member 15B is movable between the first position PE and the second position PD. In a first state where the clamping member 15B is disposed at the first position PE, the second engagement portion 24 is configured to engage with the first engagement portion 22 to position the clamping member 15B relative to the second cylinder 14 in the circumferential direction of the second cylinder 14. In a second state where the clamping member 15B is disposed at the second position PD, the second engagement portion 24 is configured to disengage from the first engagement portion 22 so that the clamping member 15B is rotatable relative to the second cylinder 14 in the circumferential direction. More specifically, in the first state where the clamping member 15B is disposed at the first position PE, the mounting member 15C is also positioned relative to the second cylinder 14 in the circumferential direction of the second cylinder 14, since the clamping member 15B and the mounting member 15C are relatively positioned in the circumferential direction via the engagement of the first positioning part 15C5 and 15C6 with the second positioning part 15B6 and 15B7. Further, in the second state where the clamping member 15B is disposed at the second position PD, the mounting member 15C is also rotatable relative to the second cylinder 14 in the circumferential direction, since the clamping member 15B and the mounting member 15C are relatively positioned in the circumferential direction via the engagement of the first positioning part 15C5 and 15C6 with the second positioning part 15B6 and 15B7.

At any position of the clamping member 15B between the first position PE and the second position PD, the second positioning part 15B6 and 15B7 engages with the first positioning part 15C5 and 15C6 so as to prevent relative rotation between the clamping member 15B and the mounting member 15C, namely, the first recessed part 15B6 engages with the first protruding part 15C5 and the second recessed part 15B7 engages with the second protruding part 15C6. At the second position PD of the clamping member 15B, the second engagement portion 24 disengages from the first engagement portion 22. Therefore, the clamping member 15B is rotatable relative to the second cylinder 14 in the circumferential direction. On the other hand, the second positioning part 15B6 and 15B7 engages with the first positioning part 15C5 and 15C6. Therefore, the clamping member 15B is configured to be rotatable together with the mounting member 15C relative to the second cylinder 14 in the circumferential direction in the state where the second positioning part 15B6 and 15B7 engages with the first positioning part 15C5 and 15C6. On the other hand, the clamping member 15B is movable relative to the mounting member 15C in the axial direction AX in the state where the second positioning part 15B6 and 15B7 engages with the first positioning part 15C5 and 15C6.

At the first position PE of the clamping member 15B, the second engagement portion 24 engages with the first engagement portion 22. Therefore, a position of the clamping member 15B relative to the second cylinder 14 in the circumferential direction is fixed. Between the first position PE and the second position PD the second positioning part 15B6 and 15B7 engages with the first positioning part 15C5 and 15C6. Therefore, at the first position PE of the clamping member 15B, a position of the mounting member 15C relative to the second cylinder 14 in the circumferential direction is also fixed.

The bicycle seatpost assembly 10 further comprises a restricting member. A configuration example in FIGS. 18 and 19, the second cylinder 14 includes two restricting members 30 provided to side part of the second cylinder 14. As shown in FIG. 13, two through-holes 14D are provided at the distal end part 14a of the second cylinder 14. The restricting members 30 each is fixed in each of the through-holes 14D.

As described above, the mounting member 15C includes the groove 15C4 extending in the circumferential direction of the second cylinder 14 (see, FIGS. 11, 18, and 19). As shown in FIGS. 18 and 19, the restricting members 30 are provided in the groove 15C4 to restrict the axial movement of the mounting member 15C relative to the second cylinder 14 in the axial direction AX. Namely, when the clamping member 15C moves relative to the second cylinder 14 in the axial direction AX, the mounting member 15C does not move relative to the second cylinder 14 in the axial direction AX.

On the other hand, as the groove 15C4 is extending in the circumferential direction of the second cylinder 14, the restricting members 30 are movable in the groove 15C4 in the circumferential direction. Therefore, the clamping member 15B is rotatable together with the mounting member 15C relative to the second cylinder 14 in a circumferential direction.

Next, an operation of the bicycle seatpost assembly 10 will be described.

For example, in a state where the mounting structure 15 is assembled as shown FIGS. 2, 3, 18, it is presumed that a user wants to change a direction of the bicycle saddle 4 in the circumferential direction of the second cylinder 14. At first, the user removes the attachment member 15A from the mounting member 15C by releasing the clamping between the clamping member 15B and the attachment member 15A.

Figure 20:
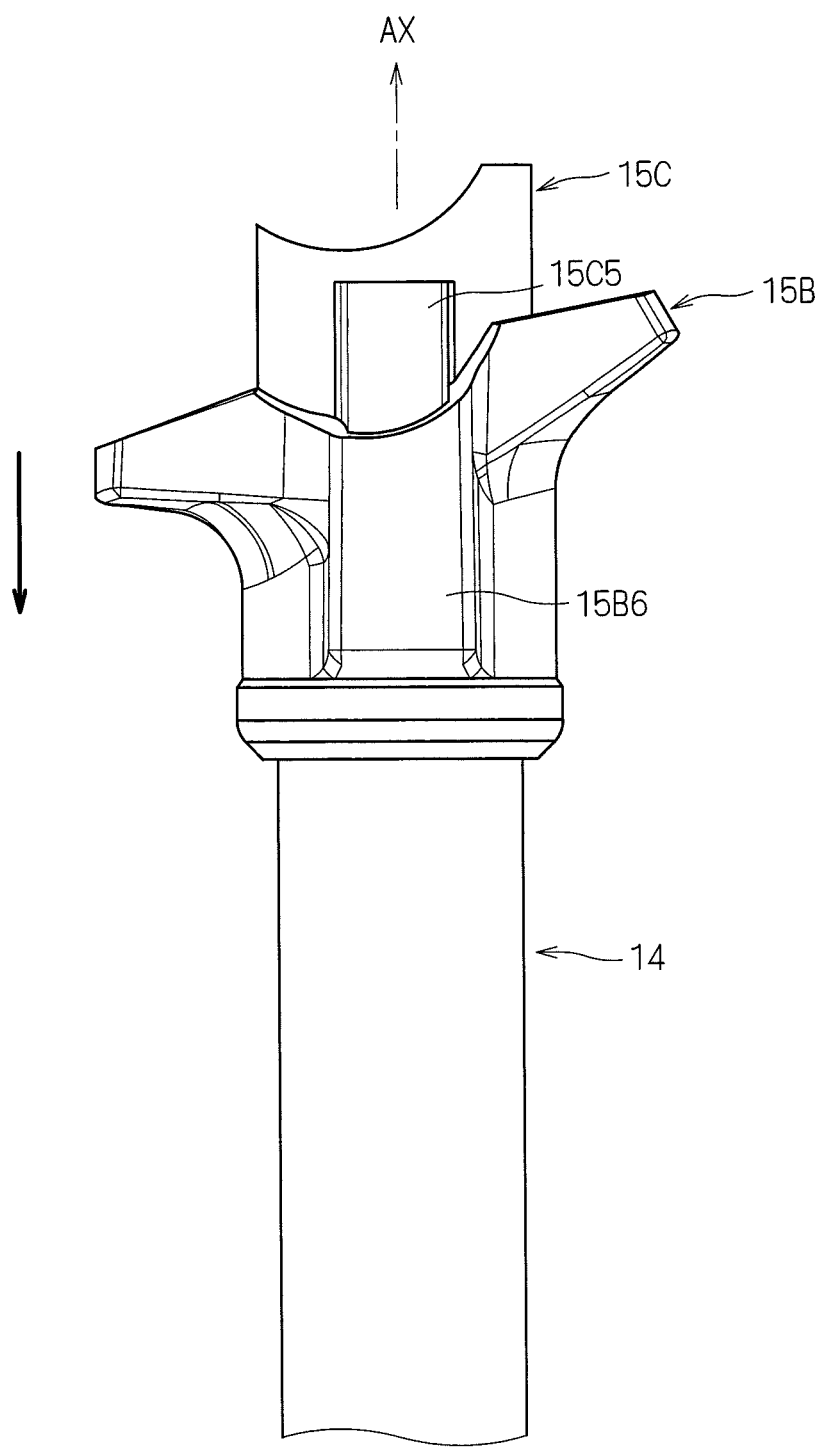
FIGS. 20-23 are views to explain an operation of the bicycle seatpost assembly in accordance with embodiment.

Then, the user moves the clamping member 15B downward. Namely, the clamping member 15B is moved downward along with the axial direction AX relative to the mounting member 15C and the second cylinder 14 in the state where the second positioning part 15B6 and 15B7 engages with the first positioning part 15C5 and 15C6 (see, FIG. 20). As the restricting members 30 are provided in the groove 15C4, the mounting member 15C does not move with the clamping member 15B in the axial direction AX. When the user moves the clamping member 15B moves in the axial direction AX from the first position PE to the second position PD, the second engagement portion 24 disengages from the first engagement portion 22 (see, FIG. 19). Therefore, in the second state, it is possible to rotate the clamping member 15B relative to the second cylinder 14 in the circumferential direction of the second cylinder 14.

Figure 21:
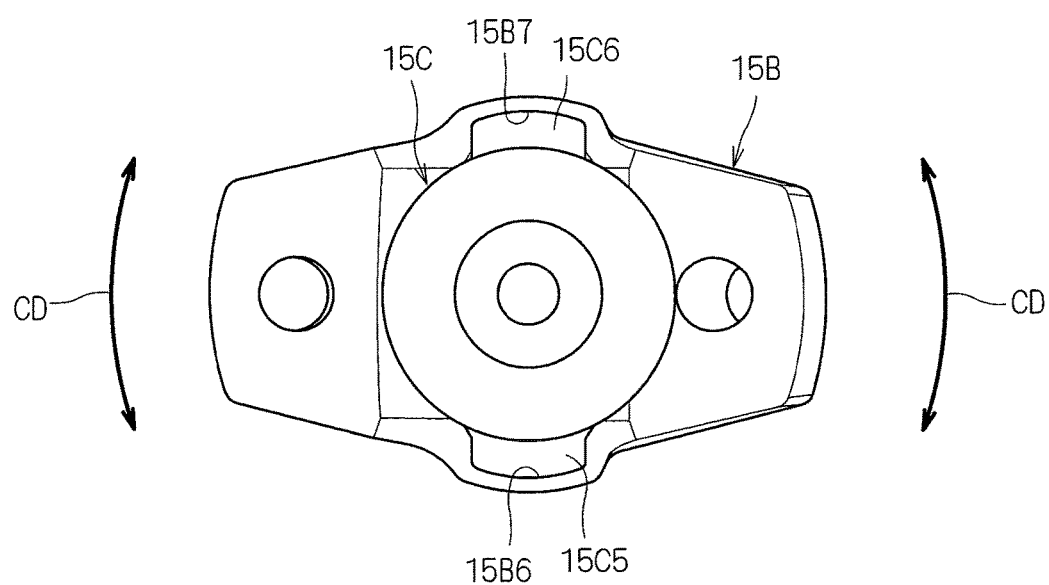
Figure 22:
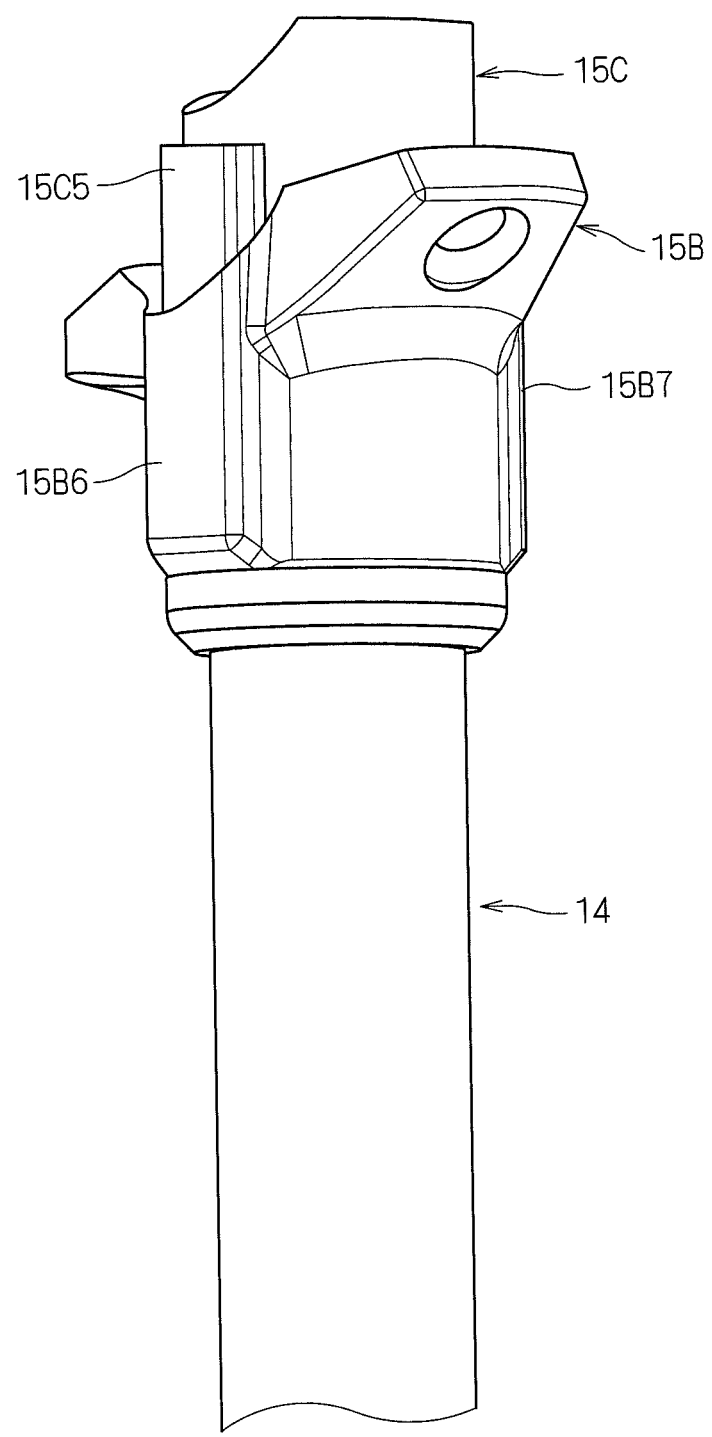

Next, as shown in FIG. 21, the user rotates the clamping member 15B to a desired position. Namely, the user rotates the clamping member 15B relative to the second cylinder 14 in the circumferential direction CD of the second cylinder 14. As the second positioning part 15B6 and 15B7 engages with the first positioning part 15C5 and 15C6 and the restricting members 30 are provided in the groove 15C4, the mounting member 15C rotates with the clamping member 15B in the circumferential direction CD. FIG. 22 shows that a state where the mounting member 15C and the clamping member 15B are moved to the desired position from the state shown in FIG. 20.

Figure 23:
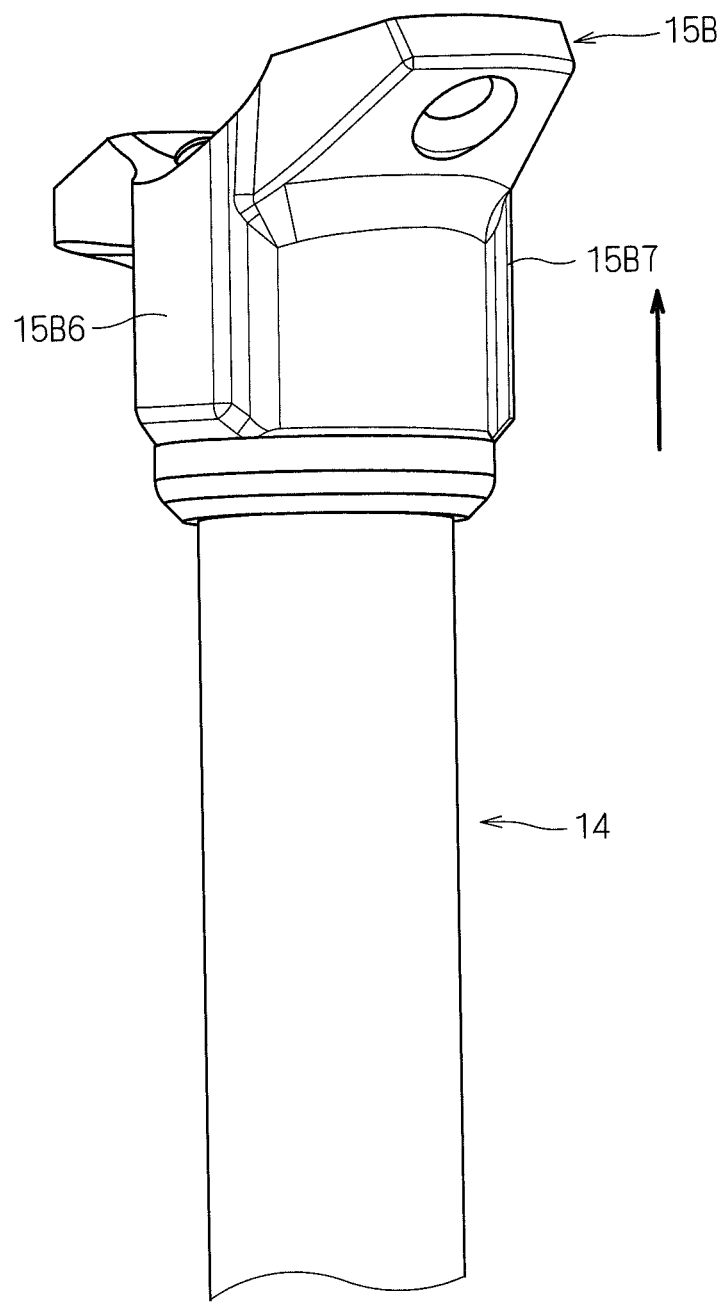

Next, the user moves the clamping member 15B upward. Namely, the clamping member 15B is moved upward along with the axial direction AX relative to the mounting member 15C and the second cylinder 14 in the state where the second positioning part 15B6 and 15B7 engages with the first positioning part 15C5 and 15C6 (see, FIG. 23). As the restricting members 30 are provided in the groove 15C4, the mounting member 15C does not move with the clamping member 15B in the axial direction AX. When the user moves the clamping member 15B in the axial direction AX from the second position PD to the first position PE, the second engagement portion 24 engages with the first engagement portion 22 (see, FIG. 18). Therefore, in the second state, it is impossible to rotate the clamping member 15B relative to the second cylinder 14 in the circumferential direction CD. A circumferential position of the mounting structure 15 (more specifically, the clamping member 15B) relative to the second cylinder 14 is selectively adjusted and fixed.

Then, the bolts 15D1 and 15D2 are engaged with the bolt mounting part (more specifically, the third hole 15B8 and the fourth hole 15B9) of the clamping member 15B to clamp the bicycle saddle 4 (more specifically, rails 4a of the bicycle saddle 4) between the clamping member 15B and the attachment member 15A (see, FIG. 3). The first engagement portion 22 engages with the second engagement portion 24 in the state where the clamping member 15B clamps the bicycle saddle 4 between the clamping member 15B and the attachment member 15A.

With the bicycle seatpost assembly 10, it is possible to obtain the following advantageous effects.

It is possible to adjust a rotational position of the bicycle saddle 4 relative to the second cylinder 14. For example, in FIG. 1, the outer cover 18 is fixed to the first cylinder 12 and it is not preferable to change a position of the outer cover 18 relative to the first cylinder 12 in the circumferential direction CD. Therefore, when the cable guiding portion 18a of the outer cover 18 is directed to a desired direction, the user has to rotate the first cylinder 12 together with the second cylinder 14. Accordingly, the mounting structure 15 attached to a distal end part 14a of the second cylinder 14 rotates in accordance with rotation of the first cylinder 12 and the second cylinder 14. Namely, the rotational position of the bicycle saddle 4 would be off the correct position due to the rotation of the mounting structure 15. As it is possible to adjust the rotation of the mounting structure 15 with the bicycle seatpost assembly 10, the rotational position of the bicycle saddle 4 can be oriented to the correct position.

With the bicycle seatpost assembly 10, it is possible to fix the rotational position of the mounting structure 15 relative to the second cylinder 14 even if a clamping force between the clamping member 15B and the attachment member 15A is small.

For example, when the rotational position of the bicycle saddle 4 relative to the second cylinder 14 is decided through a contact between the mounting surface 15C2 of the mounting member 15C and the convex curved surface S11 of the second attachment member 15b, the rotational position of the bicycle saddle 4 relative to the second cylinder 14 can be unstable. Since a slide occurs between the mounting surface 15C2 and the convex curved surface S11. On the other hand, it is possible to stabilize the rotational position of the bicycle saddle 4 relative to the second cylinder 14 with the bicycle seatpost assembly 10. Because in the bicycle seatpost assembly 10, the second engagement portion 24 provided at the clamping member 15B engages with the first engagement portion 22 provided at the second cylinder 14, and the bicycle saddle 4 is clamped using he clamping member 15B.

Figure 24:
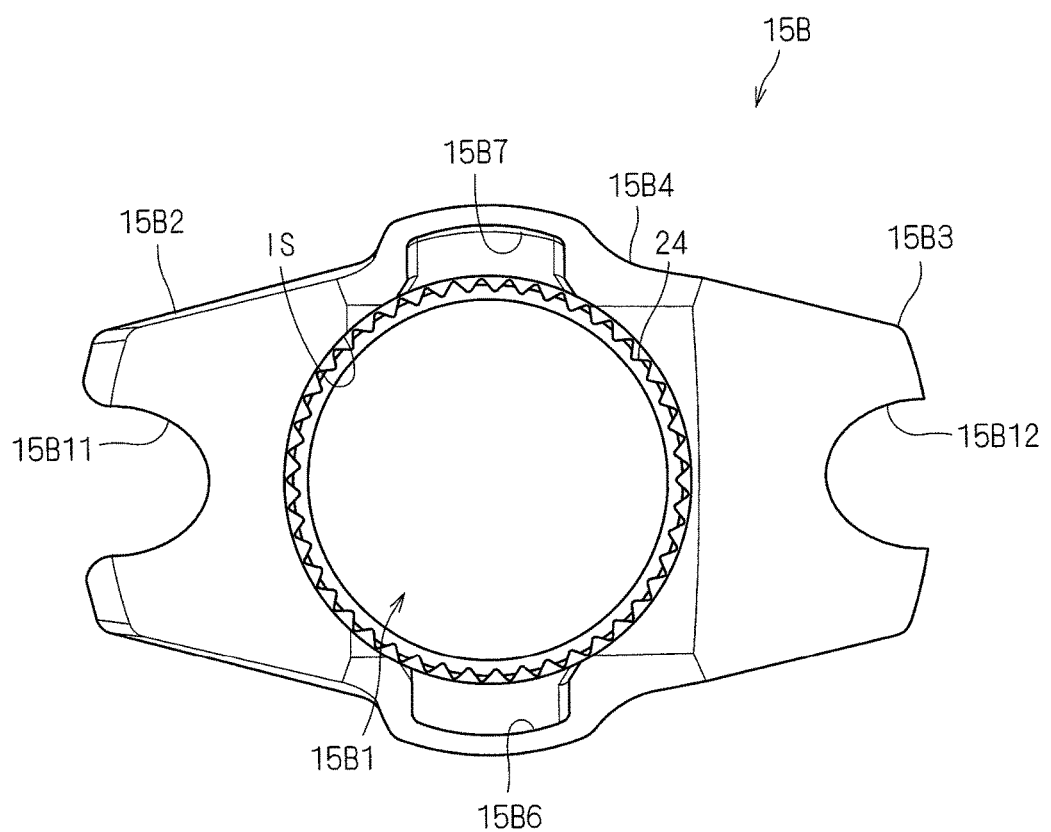
FIGS. 24 and 25 are plan views of the clamping member.

In the example of configuration shown in FIG. 9, the bolt mounting part of the clamping member 15B includes the first flange 15B2 having the third hole 15B8 and the second flange 15B3 having the fourth hole 15B9. However, an example of configuration shown in FIG. 24 can be adopted, if needed and/or desired. In FIG. 24, the bolt mounting part of the clamping member 15B includes the first flange 15B2 and the second flange 15B3, the first flange 15B2 has a first notched part 15B11, and the second flange 15B3 has a second notched part 15B12. The first bolt 15Da is provided to the first notched part 15B11 to clamp the bicycle saddle 4 between the clamping member 15B and the attachment member 15A. The second bolt 15Db is provided to the second notched part 15B12 to clamp the bicycle saddle 4 between the clamping member 15B and the attachment member 15A.

In the example of configuration shown in FIGS. 14 and 15, the first engagement portion 22 includes the first projections 22p and the first recesses 22r, and the second engagement portion 24 includes the second projections 24p and the second recesses 24r. However, the following example of configuration can be adopted, if needed and/or desired. One of the first engagement portion and the second engagement portion includes recesses extending in the axial direction AX, and the other of the first engagement portion and the second engagement portion includes a projection. The projection is configured to be selectively provided in one of the recesses to position the mounting structure 15 relative to the second cylinder 14 at one of circumferential positions.

For example, as shown in FIGS. 13 and 15, the first engagement portion 22 is provided to the outer periphery of the second cylinder 14, and the first engagement portion 22 includes the first projections 22p and the first recesses 22r.

Figure 25:
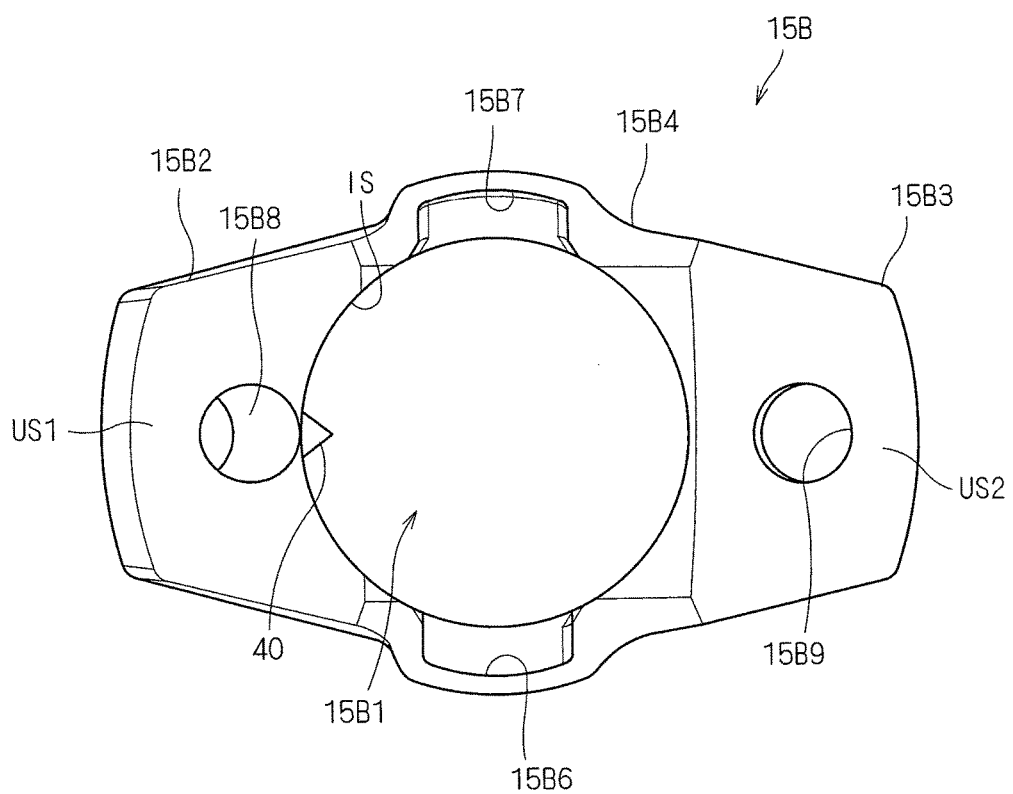
Figure 26:
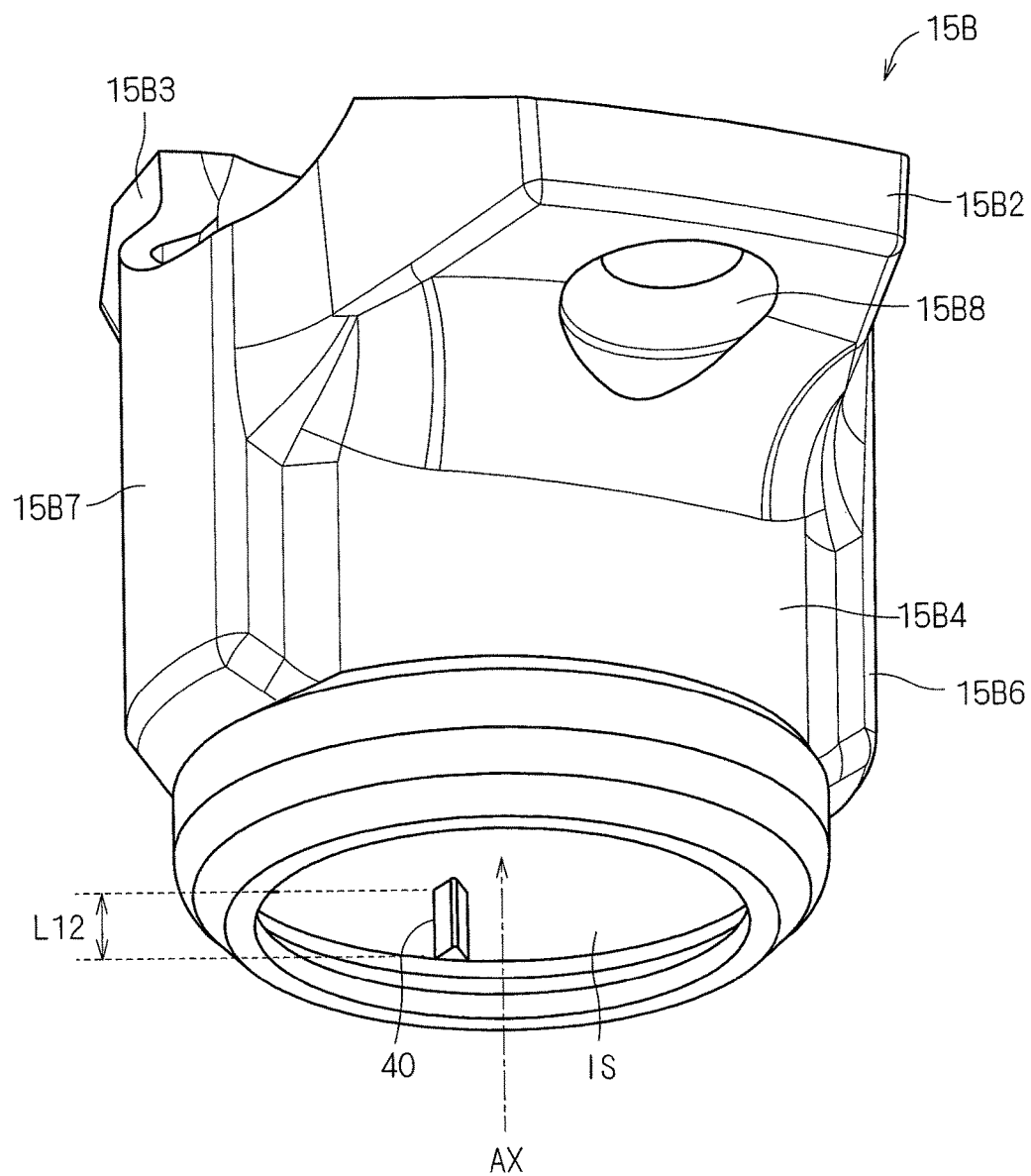
FIG. 26 is a perspective view of the clamping member.

Both of the first projections 22p and the first recesses 22r are extending in the axial direction AX. On the other hand, as shown in FIGS. 25 and 26, the second engagement portion provide to the clamping member 15B includes a projection 40. The projection 40 is extending in the axial direction AX and has a predetermined length L12 in the axial direction AX. The projection 40 is provided in the inner peripheral surface IS of the clamping member 15B at a bottom part area of the clamping member 15B. The projection 40 is configured to be selectively provided in one of the first recesses 22r to position the mounting structure 15 relative to the second cylinder 14 at one of circumferential positions. For example, the predetermined length L1 is equal to the predetermined length L12.

In the above, the clamping member 15B is moved downward in the axial direction AX to disengage between the first engagement portion 22 and the second engagement portion 24. However, it is adoptable that the clamping member 15B is moved upward to disengage between the first engagement portion 22 and the second engagement portion 24, if needed and/or desired. For example, the clamping member 15B is pulled out of the distal end part 14a of the second cylinder 14 to disengage between the first engagement portion 22 and the second engagement portion 24.

Figure 27:
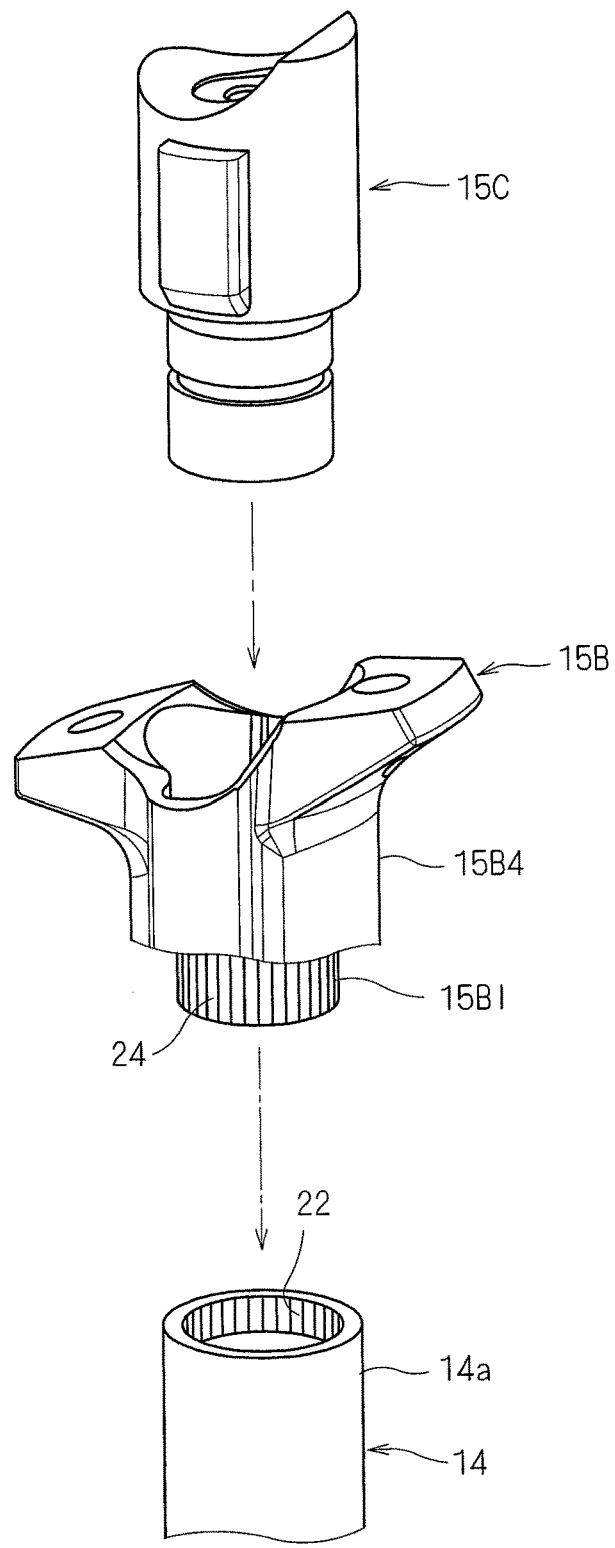
FIG. 27 is disassembled perspective views of the bicycle seatpost assembly.

In the example of configuration shown in FIGS. 13-15, the first engagement portion 22 is provided to the outer periphery of the second cylinder 14, and the second engagement portion 24 is provided in the inner peripheral surface IS of the clamping member 15B. However, as shown in FIG. 27, it is adoptable that the first engagement portion 22 is provided in the inner peripheral surface of the second cylinder 14, and the second engagement portion 24 is provided to the outer periphery of the clamping member 15B, if needed and/or desired. In FIG. 27, the clamping member 15B includes the insert part 15BI that is extending from the bottom of the tubular part 15B4. The second engagement portion 24 is provided to the outer periphery of the insert part 15BI. The insert part 15BI is provided in the second cylinder 14 so that the first engagement portion 22 is engaged with the second engagement portion 24.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body", and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle seatpost assembly comprising:
a first cylinder;
a second cylinder configured to be telescopically received in the first cylinder;
a mounting structure attached to a distal end part of the second cylinder, the mounting structure being configured to fixedly mount a bicycle saddle to the distal end part of the second cylinder, the mounting structure including:
an attachment member;
a mounting member having a mounting surface on which the attachment member is mounted; and
a clamping member configured to clamp the bicycle saddle between the clamping member and the attachment member;
a first engagement portion provided to an outer periphery of the second cylinder; and
a second engagement portion that is integrally attached to the clamping member and that is configured to engage with the first engagement portion such that a circumferential position of the mounting structure relative to the second cylinder is selectively adjustable, wherein
the second cylinder is telescopically movable relative to the first cylinder in an axial direction,
one of the first engagement portion and the second engagement portion includes recesses, each of the recesses having a bottom extending in the axial direction,
the other of the first engagement portion and the second engagement portion includes a projection configured to be selectively provided in one of the recesses to position the mounting structure relative to the second cylinder at one of circumferential positions,
the clamping member is configured to be movable relative to the mounting member in the axial direction,
the clamping member is configured to be rotatable together with the mounting member relative to the second cylinder in a circumferential direction of the second cylinder, and
the mounting member and the clamping member are separate members.

2. The bicycle seatpost assembly according to claim 1, wherein
the clamping member includes a bolt mounting part with which a bolt is to engage to clamp the bicycle saddle between the clamping member and the attachment member.

3. The bicycle seatpost assembly according to claim 1, wherein
the clamping member includes a tubular part in which the distal end part of the second cylinder is provided, and
the second engagement portion is provided in an inner peripheral surface of the tubular part.

4. The bicycle seatpost assembly according to claim 1, wherein
the first engagement portion includes
first projections extending in the axial direction, and
first recesses each defined between adjacent two of the first projections,
the second engagement portion includes
second projections extending in the axial direction, and
second recesses each defined between adjacent two of the second projections,
the first projections are configured to be respectively provided in the second recesses, and
the second projections are configured to be respectively provided in the first recesses.

5. The bicycle seatpost assembly according to claim 1, wherein
the mounting surface has a curved shape.

6. The bicycle seatpost assembly according to claim 1, wherein
the mounting member includes a first positioning part,
the clamping member includes a second positioning part configured to engage with the first positioning part, and
the clamping member is configured to be rotatable together with the mounting member relative to the second cylinder in the circumferential direction in a state where the second positioning part engages with the first positioning part.

7. The bicycle seatpost assembly according to claim 6, wherein
the clamping member is configured to be movable relative to the mounting member in the axial direction in a state where the second positioning part engages with the first positioning part.

8. The bicycle seatpost assembly according to claim 1, wherein
the clamping member is configured to be movable relative to the second cylinder in the axial direction between a first position and a second position,
the second engagement portion is configured to engage with the first engagement portion to position the clamping member relative to the second cylinder in a circumferential direction of the second cylinder in a first state where the clamping member is disposed at the first position, and
the second engagement portion is configured to disengage from the first engagement portion so that the clamping member is rotatable relative to the second cylinder in the circumferential direction in a second state where the clamping member is disposed at the second position.

9. The bicycle seatpost assembly according to claim 1, wherein
the mounting member includes a groove extending in a circumferential direction of the second cylinder, and
the bicycle seatpost assembly further comprising
a restricting member provided in the groove to restrict an axial movement of the mounting member relative to the second cylinder in the axial direction.

10. The bicycle seatpost assembly according to claim 6, wherein
the first positioning part is in contact with the second positioning part in the axial direction in a state where the second engagement portion engages with the first engagement portion.

11. The bicycle seatpost assembly according to claim 1, wherein
the first engagement portion engages with the second engagement portion in a state where the clamping member clamps the bicycle saddle between the clamping member and the attachment member.

12. The bicycle seatpost assembly according to claim 1, wherein
the first engagement portion is provided at the distal end part of the second cylinder.

13. A bicycle seatpost assembly comprising:
a first cylinder;
a second cylinder configured to be telescopically received in the first cylinder;

a mounting structure attached to a distal end part of the second cylinder, the mounting structure being configured to fixedly mount the bicycle seat to the distal end part of the second cylinder, the mounting structure including:
an attachment member;
a mounting member having a mounting surface on which the attachment member is mounted; and
a clamping member configured to clamp the bicycle saddle between the clamping member and the attachment member, the clamping member having a hole through which a bolt is inserted to clamp the bicycle saddle;
a first engagement portion provided to the second cylinder; and
a second engagement portion integrally attached to the clamping member, the second engagement member being configured to engage with the first engagement portion such that a circumferential position of the mounting structure relative to the second cylinder is selectively adjustable, wherein
the clamping member is configured to be movable relative to the mounting member in the axial direction,
the clamping member is configured to be rotatable together with the mounting member relative to the second cylinder in a circumferential direction of the second cylinder, and
the mounting member and the clamping member are separate members.

14. The bicycle seatpost assembly according to claim 1, wherein
the first engagement portion is provided on a side surface of the second cylinder.

15. The bicycle seatpost assembly according to claim 1, wherein
the second engagement portion is configured to engage with the first engagement portion in a direction substantially perpendicular to the axial direction.

16. The bicycle seatpost assembly according to claim 1, wherein
the second engagement portion is configured to be disengaged with the first engagement portion by moving the second engagement portion in a first direction aligned with the axial direction, and
the mounting structure limits a movement of the second engagement portion in a second direction opposite to the first direction.

17. The bicycle seatpost assembly according to claim 1, further comprising:
a restricting member configured to restrict an axial movement of the mounting member relative to the second cylinder in the axial direction while permitting movement of the clamping member in the axial direction relative to the second cylinder, wherein
the second engagement portion is configured to be disengaged with the first engagement portion by moving the second engagement portion in a first direction aligned with the axial direction with the restricting member.

18. The bicycle seatpost assembly according to claim 1, wherein
the clamping member surrounds an outer circumferential surface of the mounting member.

19. The bicycle seatpost assembly according to claim 13, wherein
the second engagement portion is configured to be disengaged with the first engagement portion by moving the second engagement portion in a first direction aligned with the axial direction, and
the mounting structure limits a movement of the second engagement portion in a second direction opposite to the first direction.

20. The bicycle seatpost assembly according to claim 13, further comprising:
a restricting member configured to restrict an axial movement of the mounting member relative to the second cylinder in the axial direction, wherein
the second engagement portion is configured to be disengaged with the first engagement portion by moving the second engagement portion in a first direction aligned with the axial direction.

21. The bicycle seatpost assembly according to claim 13, wherein
the clamping member surrounds an outer circumferential surface of the mounting member.

22. The bicycle seatpost assembly according to claim 1, wherein
the clamping member includes a tubular part in which the distal end part of the second cylinder is provided, and
the second engagement portion extends from an inner peripheral surface of the tubular part.

23. The bicycle seatpost assembly according to claim 1, wherein
the circumferential position of the clamping member relative to the second cylinder is selectively adjustable by rotating the clamping member in the circumferential direction of the second cylinder in a state where the mounting member is mounted on the second cylinder.

24. The bicycle seatpost assembly according to claim 23, wherein
the circumferential position of the clamping member relative to the second cylinder is selectively adjustable by rotating the clamping member together with the mounting member after the clamping member is moved relative to the mounting member in the axial direction, so as to separate the first engagement portion and the second engagement portion, while the clamping member engages with the mounting member.

25. The bicycle seatpost assembly according to claim 13, wherein
the clamping member includes a tubular part in which the distal end part of the second cylinder is provided, and
the second engagement portion extends from an inner peripheral surface of the tubular part.

26. The bicycle seatpost assembly according to claim 13, wherein
the circumferential position of the clamping member relative to the second cylinder is selectively adjustable by rotating the clamping member in the circumferential direction of the second cylinder in a state where the mounting member is mounted on the second cylinder.

27. The bicycle seatpost assembly according to claim 26, wherein
the circumferential position of the clamping member relative to the second cylinder is selectively adjustable by rotating the clamping member together with the mounting member after the clamping member is moved relative to the mounting member in the axial direction, so as to separate the first engagement portion and the second engagement portion, while the clamping member engages with the mounting member.

* * * * *